US007893866B2

(12) United States Patent
Dark et al.

(10) Patent No.: US 7,893,866 B2
(45) Date of Patent: Feb. 22, 2011

(54) DYNAMIC REPLANNING ALGORITHM FOR AIRCREW DISPLAY AID TO ASSESS JAM EFFECTIVENESS

(75) Inventors: James Dark, Camarillo, CA (US); James Buscemi, Camarillo, CA (US); Scott Burkholder, Moorpark, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 2 days.

(21) Appl. No.: 12/040,412

(22) Filed: Feb. 29, 2008

(65) Prior Publication Data

US 2008/0297396 A1      Dec. 4, 2008

Related U.S. Application Data

(63) Continuation-in-part of application No. 11/901,545, filed on Sep. 12, 2007, now Pat. No. 7,515,096, which is a continuation-in-part of application No. 11/820,033, filed on May 30, 2007, now Pat. No. 7,427,947.

(51) Int. Cl.
    *G01S 7/38*     (2006.01)
    *G01S 7/40*     (2006.01)
    *G01S 13/00*    (2006.01)
    *G01S 7/00*     (2006.01)

(52) U.S. Cl. ........................... 342/173; 342/13; 342/14; 342/20; 342/89; 342/165; 342/175; 342/176; 342/180; 342/181; 342/195; 455/1

(58) Field of Classification Search ................. 89/1.11; 342/13–20, 89, 90, 165, 173–186, 192–197; 455/1, 67.11–67.7, 130, 269, 272, 278.1; 701/1–28, 200–223

See application file for complete search history.

(56) References Cited

U.S. PATENT DOCUMENTS 4,025,920 A * 5/1977 Reitboeck et al. ............. 342/13

(Continued)

OTHER PUBLICATIONS

P.E. Black, editor, definition entry for the term "data structure" in the "Dictionary of Algorithms and Data Structures"; Dec. 15, 2004; available on the Internet at nist.gov.*

(Continued)

*Primary Examiner*—Bernarr E Gregory
(74) *Attorney, Agent, or Firm*—Robert R. Lerma; David S. Kalmbaugh; Christopher L. Blackburn

(57) ABSTRACT

The invention generally relates to the field of computer software particularly to an improved method of providing aircrew decision aids for use in determining the optimum placement of an Electronic Attack (EA) aircraft. The core of the invention is a software program that will dynamically provide the EA flight crew situational awareness regarding a threat emitter's coverage relative to the position of the EA aircraft and to the position of any number of protected entities (PE). The software program generates information to provide visual cues representing a Jam Acceptability Region (JAR) contour, a Jam Assessment Strobe (JAS) and text for display on a number of flexibly configurable display formats posted on display units. The JAR and JAS graphics and text will aid the EA aircrew in rapidly assessing the effectiveness of a given jamming approach. It is emphasized that this abstract is provided to comply with the rules requiring an abstract that will allow a searcher or other reader to quickly ascertain the subject matter of the technical disclosure. It is submitted with the understanding that it will not be used to interpret or limit the scope of the claims.

15 Claims, 31 Drawing Sheets

U.S. PATENT DOCUMENTS

| | | | | |
|---|---|---|---|---|
| 4,194,205 | A * | 3/1980 | Willmore et al. | 342/173 |
| 4,581,767 | A * | 4/1986 | Monsen | 455/67.11 |
| 5,128,679 | A * | 7/1992 | Moffat | 342/13 |
| 5,278,908 | A * | 1/1994 | Parikh et al. | 455/1 |
| 5,313,209 | A * | 5/1994 | Michaels et al. | 342/13 |
| 5,940,033 | A * | 8/1999 | Locher et al. | 342/19 |
| 6,084,540 | A * | 7/2000 | Yu | 342/17 |
| 6,476,755 | B1 * | 11/2002 | Senio et al. | 342/15 |
| 6,480,139 | B1 * | 11/2002 | Hoctor | 342/13 |
| 6,697,008 | B1 * | 2/2004 | Sternowski | 342/14 |
| 6,704,557 | B1 * | 3/2004 | Krishnamurthy et al. | 455/278.1 |
| 6,748,351 | B1 * | 6/2004 | Hynes et al. | 342/13 |
| 6,757,324 | B2 * | 6/2004 | Fitzrandolph | 455/1 |
| 6,771,220 | B1 * | 8/2004 | Ashe et al. | 342/14 |
| 6,894,634 | B2 * | 5/2005 | Gounalis | 342/13 |
| 6,944,422 | B2 * | 9/2005 | Fitrandolph | 455/1 |
| 7,002,509 | B2 * | 2/2006 | Karlsson | 342/90 |
| 7,348,919 | B2 * | 3/2008 | Gounalis | 342/165 |
| 7,358,887 | B2 * | 4/2008 | Gounalis | 342/20 |
| 7,427,947 | B1 * | 9/2008 | Dark et al. | 342/173 |
| 7,511,657 | B2 * | 3/2009 | Dark et al. | 342/173 |
| 7,515,096 | B2 * | 4/2009 | Dark et al. | 342/173 |
| 7,737,883 | B2 | 6/2010 | Dark et al. | |
| 2002/0149510 | A1 * | 10/2002 | Salzeder | 342/13 |
| 2004/0130476 | A1 * | 7/2004 | Gounalis | 342/13 |
| 2004/0135717 | A1 * | 7/2004 | Gounalis | 342/13 |
| 2006/0164283 | A1 * | 7/2006 | Karlsson | 342/14 |

OTHER PUBLICATIONS

J. Geikas, "Jammer Effectiveness Model"; National Telecommunications and Information Administration, Institute for Telecommunication Science, U.S. Department of Commerce; Boulder, Colorado, USA; Publication 95-317; May 1995.*

N. DeMinco, "Engineering Manual for the Jammer Effectiveness Model"; National Telecommunications and Information Adminstration, Institute for Telecommunication Science, U.S. Department of Commerce; Boulder, Colorado, USA; Publication 95-322; Sep. 1995.*

* cited by examiner

| (J,I) | TIME 1 HDG | TIME 1 SPEED | TIME 1 ALT | TIME 1 JEP SCORE | TIME 1 ELIGIBLE | TIME 1 JAR DATA | TIME 2 HDG | ... | TIME 2 ELIGIBLE | ... | TIME 5 HDG | ... | TIME 5 ELIGIBLE | TIME 5 JAR DATA |
|---|---|---|---|---|---|---|---|---|---|---|---|---|---|---|
| PASS 1 | EXT | EXT | EXT | $N_1$ | YES | $D_1$ | EXT | | YES | | EXT | | YES | $D_{51}$ |
| PASS 2 | EMOD | EXT | EXT | $N_2$ | YES | $D_2$ | EMOD | | YES | | EMOD | | YES | $D_{52}$ |
| PASS 3 | EXT | EMOD | EXT | $N_3$ | YES | $D_3$ | EMOD | | YES | | EMOD | | NO | . |
| PASS 4 | EXT | EXT | EMOD | $N_4$ | YES | $D_4$ | EXT | | NO | | . | | . | . |
| ... | | | | | | | | | | | | | | |
| PASS 27 | MOD | MOD | EMOD | $N_{27}$ | YES | $D_{27}$ | EMOD | | NO | | . | | . | . |
| COUNT | | | | | SUMMED NUMBER OF YES'S | | | | SUMMED NUMBER OF YES'S | | | | SUMMED NUMBER OF YES'S | |

EXT = EXTRAPOLATED UNMODIFIED PARAMETER   EMOD = EXTRAPOLATED AND MODIFIED PARAMETER

FIG 27

DYNAMIC REPLANNING ALGORITHM FOR AIRCREW DISPLAY AID TO ASSESS JAM EFFECTIVENESS

CROSS-REFERENCE TO RELATED APPLICATIONS

This application claims priority under 35 U.S.C. §120 and is a continuation-in-part of U.S. patent application Ser. No. 11/901,545, now U.S. Pat. No. 7,515,096, filed Sep. 12, 2007, which is a continuation-in-part of U.S. patent application Ser. No. 11/820,033, now U.S. Pat. No. 7,427,947 filed May 30, 2007, the entire disclosures of which are incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefore.

BACKGROUND OF THE INVENTION

1. Field of the Invention

The invention relates to the field of computer software and particularly to an improved method for displaying aircrew decision aids for use in determining the optimum placement of an Electronic Attack (EA) aircraft. The core of the invention is a software program that dynamically provides a set of projected flight path positions for display to the EA flight crew. The software program of the present invention generates information to populate various display formats representing, for example, a jamming score as well as a prioritized list of future aircraft positions. The display formats aid the EA aircrew in assessing the effectiveness of a given jamming approach and assists in projecting an optimum flight path for both Protected Entity (PE) and EA aircraft. The projected optimum PE and EA flight paths are determined in software executing the Dynamic Mission Re-planning Tool (DMRT) in a computer. The projected optimum flight paths minimize exposure of PE and EA to threat emitters thus enhancing the probability of successful accomplishment of their mission.

2. Description of the Prior Art

Electronic Warfare (EW) tactics employed by EA aircraft strive to direct electromagnetic energy into a threat radar receiver with sufficient power to prevent the threat radar receiver from accurately detecting or tracking the PE. EW includes the basic concepts of Noise Jamming and Deception Jamming. Key to the successful jamming effort is generating a signal that exceeds the expected target return signal seen by the threat receiver and concentrating the radar jamming signal in the direction of the threat receiver antenna. Barrage noise jamming floods the threat radar receiver with massive amounts of electronic emissions and significantly degrades low technology threat receiver performance. With the evolution of advanced radar concepts the noise jamming approach is less effective against high technology threat emitters. Advanced technology threat radar emitters have led to tuning the EA jamming frequency to match the frequency of the threat emitter and to follow any frequency hopping or other frequency agile characteristics the threat emitter may employ. Deception jamming requires the EA platform to generate a signal that is similar to the target return signal the threat receiving system expects while modifying target characteristics such as return signal strength, range, heading, velocity or acceleration. Overcoming multiple threat emitters employing advanced radar techniques, while transitioning a hostile area and providing protection jamming is a high workload environment for an aircrew. Cockpit display information and aircrew decision aids are required to improve situational awareness for the EA aircrew. It is an objective of this invention to reduce aircrew workload by providing decision aids.

Systems to aid the EA flight crew decision making process in positioning the jamming source carried by the EA are in need of improvement. Current aids available to EA flight crew provide text and rudimentary visual cues depicting gross EA position relative to threat receiver position. Current EA systems force the flight crew to manually incorporate current PE position relative to the position of the EA and threat receiver, then forces the aircrew to manually determine the optimum EW countermeasure to employ and to also manually determine the best projected EA aircraft position, all of which drives up aircrew workload. Current systems are incapable of fusing EA jamming capability with projected threat emitter performance information in order to obtain optimal geometrical positioning of the EA relative to threat emitters. The novel method of the present invention for combining threat emitter system characteristics with EA aircraft capabilities while simultaneously incorporating PE position on a series of flexibly configurable display formats greatly reduces EA aircrew workload and makes the EA more effective.

SUMMARY OF THE INVENTION

A preferred embodiment is a software program that generates information used to display a set of projected flight paths (look-ahead positions) while accounting for a multitude of ground based threat emitters. Electronic Warfare (EW) employs tactics to direct electromagnetic energy into the enemy radar receiver to prevent the receiver from accurately detecting the PE. Key to successful radar jamming is obtaining the proper Signal to Noise (S-N) ratio threshold. One of the most critical factors in achieving this S-N ratio is placing the EA jamming signal in the correct geometric position to blind the threat receiver while the threat antenna is directed at the PE. The Dynamic Mission Re-planning (DMR) software implemented algorithm as presently disclosed is a preferred embodiment of this invention. The DMR algorithm is a real-time software application called by the JAM Assessment software program that is employed by the EA aircrew during prosecution of their tactical mission. The DMR algorithm drives cockpit displays to provide the aircrew with visual cues that enable the flight crew to better ascertain future jamming effectiveness.

For the EA to determine its optimal future (look-ahead) position it must continually ascertain an extrapolated position of the PE in relationship to each threat emitter and mathematically generate a Jam Acceptability Region (JAR) as well as its own position within the JAR. The DMR portion of the Jam Assessment software program must account for the interaction of the JAR and the PE position as the PE transits its flight path. The DMR portion of the Jam Assessment software program processes or blends the extrapolated future position of the EA aircraft and PE aircraft with the information residing in an electronic library designated as an Electronic Order of Battle (EOB). The positional and EOB information processed by the DMR portion of the Jam Assessment software program is used by the Display Management routine to generate the graphical cues and text for display in a user selectable format allowing a rapid assessment of current and future jamming effectiveness.

The Jam Assessment software program has at its core three components. The first is a JAR processing algorithm which sends results to a second component, an integrated display management routine. The third component is the DMR portion of the Jam Assessment software program which also sends results to the second component. These components are executed on platform computers and display hardware to provide the user with an improved situational awareness.

BRIEF DESCRIPTION OF THE DRAWINGS

The features described above, other features, aspects, and advantages of the present invention will become better understood with regard to the following description, appended claims, and accompanying drawings where:

FIG. 27 is a representative final Scoring Array used as a basis to publish the results of the DMR algorithm.

DETAILED DESCRIPTION OF THE PREFERRED EMBODIMENT

Figure 1:
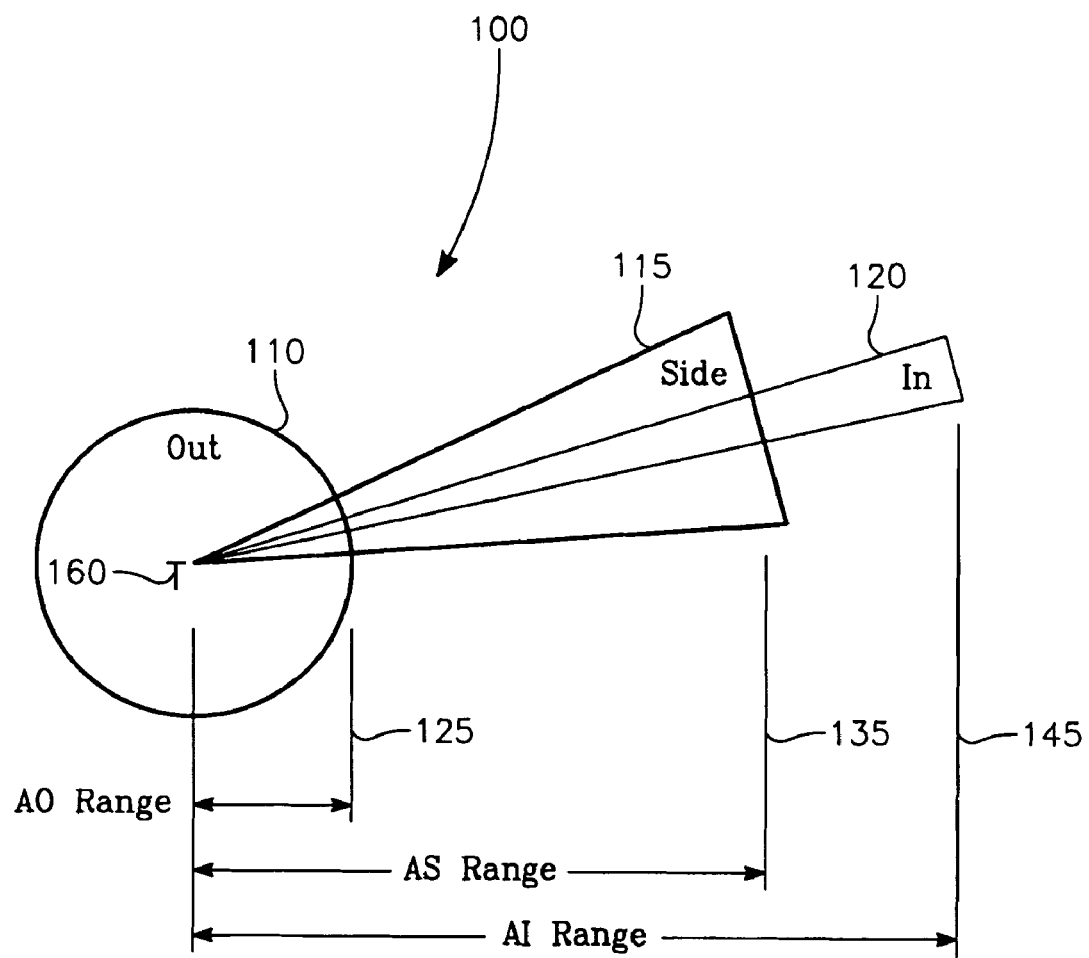
FIG. 1 is a drawing showing the various Jam Acceptability Region (JAR) contours.

The present invention comprises a method and computer implemented software module that efficiently and simultaneously receives disparate information and transforms the disparate information into a series of graphical and textual display formats. The graphical and textual displays convey information useful to position the EA relative to a threat emitter system. A typical threat emitter system, such as a radar, is composed of an antenna, a transmitter, a receiver, electronics to process information received and a user interface. Key to the success of any radar jamming technique is exceeding the Signal to Noise ratio threshold that is an inherent characteristic of the threat emitter system. When the noise signal generated by the EA exceeds the signal return of the PE the threat emitter system is defeated. Likewise, if the EA generates a stronger yet similar signal to the actual return signal of the PE while shifting a PE parameter, such as range or speed, the threat emitter system will be deceived, masking the true position of the PE. Generating a jamming signal to mask the true position, speed or course of the PE degrades acquisition and tracking performance in the threat emitter system.

Generally, threat radar coverage is viewed as the instantaneous threat radar volume swept vertically and horizontally over time through azimuth and elevation limits defined by the threat radar antenna. Multiple three-dimensional concentric beams extend from the transmitting antenna and compose the threat radar volume. The threat radar volume is composed of a main-lobe, numerous side-lobes and numerous back-lobes. The main-lobe extends much farther than any side-lobe or back-lobe. The main-lobe is the primary beam that is swept across a target to generate a return signal strong enough to be detected by a threat receiver. One critical factor in successful radar jamming is placing the jamming signal emitted by the EA in a position to enter the threat receiver via the threat antenna while the threat antenna is directed at the PE.

In addition to the geometric relationship (bearing relationship) of the EA and the PE to the threat emitter system other factors also determine the effectiveness of the threat emitter system. The other factors are the jamming technique and the jamming tactic employed by the EA. Two representative jamming techniques are Preemptive Assignment (PA) and Reactive Assignment (RA). The PA technique is invoked when the threat emitter characteristics and threat emitter location are known before the mission is undertaken. The RA technique is employed when an unexpected threat emitter or threat emitter wave form are encountered during a mission requiring the EA to adapt to the threat. Generally, the PA technique results in Jam Acceptability Region (JAR) contours that are smaller in area and shorter in range relative to the JAR contours associated with the RA technique. A JAR is defined as the family of positions an EA may occupy and still provide effective jamming to the PE. The difference in area and range, PA relative to RA, is attributed to the relationship of bandwidth to power. When an EA jams the entire known PA bandwidth for a planned threat emitter lower EA jam power is applied to any specific threat emitter frequency. When the EA detects a threat emitter the RA jamming power may be narrowed into a band focused on the frequency of interest resulting in a JAR that has a larger area and a longer range, relative to the PA JAR.

Three representative jamming tactics are associated with three JAR contours, irrespective of activating either a PA or an RA technique. Referring to FIG. 1, two dimensional depictions of the three dimensional JAR contours are Out of Alignment (O) 110, Side-Lobe Alignment (S) 115 and In Main-Lobe Alignment (I) 120. The Out of Alignment tactic 110 means the jamming asset can be geographically located anywhere within a hemispherical region centered at the threat emitter and will remain effective in protecting the PE. This is by-far the simplest tactic. The center of JAR 110 represents the location of threat emitter system 160. A disadvantage of the Out of Alignment tactic is that the EA must be close in range 125 to the threat antenna in order to impart adequate energy to exceed the threat receiver signal to noise ratio, regardless of the direction of arrival of the EA jamming signal. To overcome this range vulnerability the S or I tactic is used. Using either the S or I tactic necessitates maintaining a stringent geometric relationship between the EA and the PE to the threat emitter system.

The S tactic results in a conically shaped JAR directly related to the side lobe radiation pattern of the threat emitter antenna. The EA is effective anywhere within JAR 115 provided the EA does not exceed the S range 135.

Successful jamming of the threat emitter system using the S tactic requires the EA to be within the side-lobe volume of the threat emitter while the main lobe of the threat emitter volume encompasses the PE. While the S tactic increases the standoff range for the EA, relative to the O tactic, the EA is effective only while maintaining the geometric relationship to the PE and to the threat emitter.

The I tactic results in a conically shaped JAR directly related to the main lobe radiation pattern of the threat emitter antenna. A two dimensional depiction of the conically shaped JAR 120 contour is depicted in FIG. 1. The EA is effective anywhere within JAR 120 provided the EA does not exceed I range 145.

The I tactic provides an improved EA stand off range from the threat antenna but requires that a stringent geometric relationship be maintained between the EA and PE to the threat antenna. The I tactic requires that the EA and PE are in alignment while the threat antenna main-lobe volume encompasses the PE, hence the narrowness of JAR 120.

Each of the techniques and tactics are combined in all permutations to produce a set of jamming approaches, schemes, or techniques to degrade the performance of the threat emitter system. The jamming approaches or schemes are: Preemptive Assignment—Out of Alignment (PAO), Preemptive Assignment—In Side-Lobe Alignment (PAS), Preemptive Assignment—In Main-Lobe Alignment (PAI), Reactive Assignment—Out of Alignment (RAO), Reactive Assignment—In Side-Lobe Alignment (RAS), and Reactive Assignment—In Main-Lobe Alignment (RAI).

A given EA jamming approach has a determinable impact upon the threat emitter radar coverage. The JAR represents a volume of space in which the EA may position itself to provide effective jamming to mask the PE or deceive the threat emitter system regarding the true course and speed of the PE. Generating the JAR, assessing jamming effectiveness, determining optimum positioning of the EA and conveying this information to the EA aircrew are realized objectives of the present invention.

Figure 2:
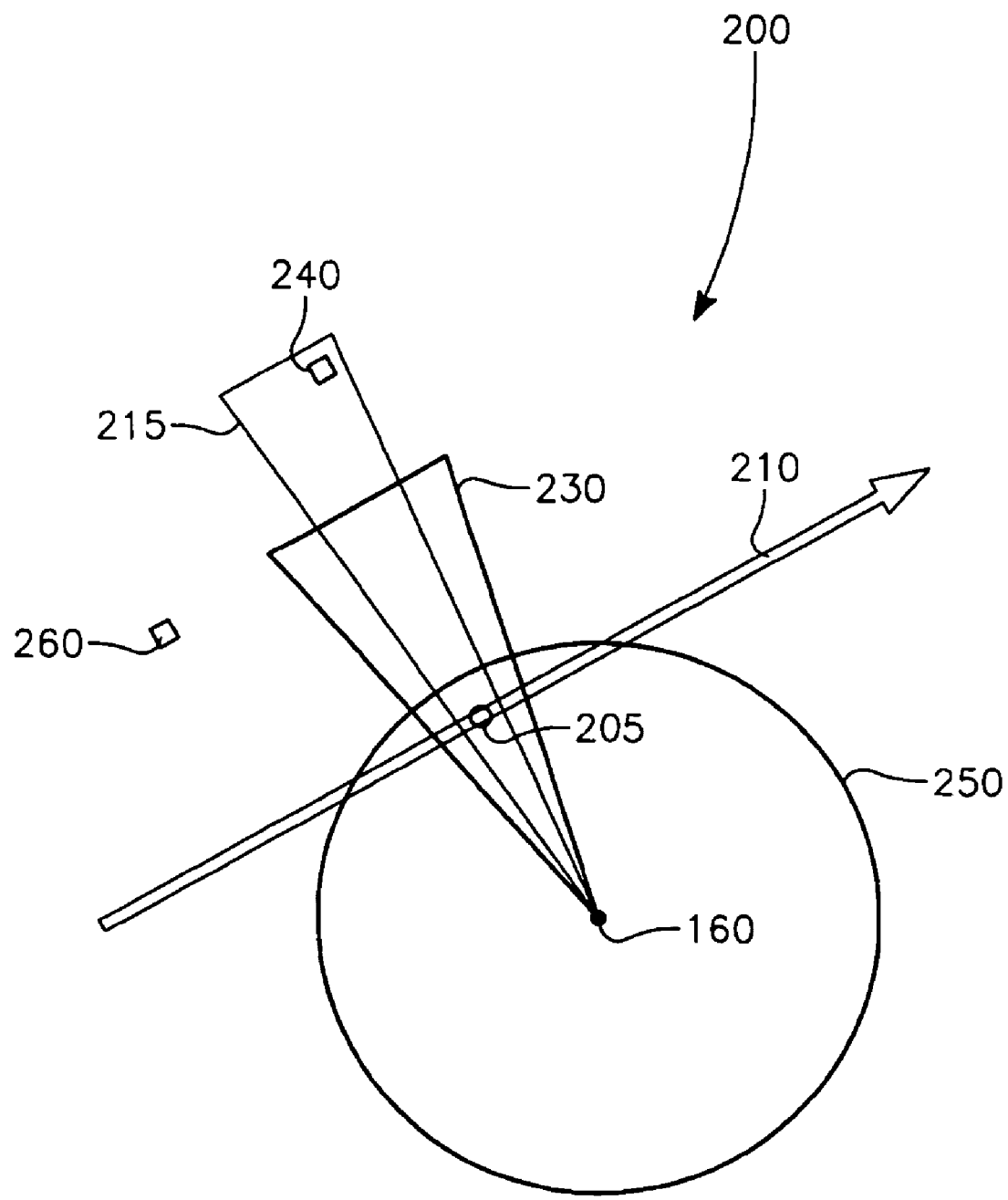
FIG. 2 is a drawing showing the relationships between the JAR, the threat emitter system, the EA and the PE flight path.

Referring to FIG. 2, JAR volumes for PAO-JAR 250, PAS-JAR 230 and PAI-JAR 215 are represented as two dimensional JAR areas. A JAR defines an area in which an EA may position itself for a given jamming approach or scheme and still provide protective jamming to the PE. As PE 205 progresses along its flight path 210, PAI-JAR 215 and PAS-JAR 230 will remain centered on PE 205. The EA 240 must maintain its position within PAI-JAR 215 and move along with PAI-JAR 215 while jamming threat emitter system 160 using the PAI jamming approach. Positioning EA 240 in the corner of PAI-JAR 215 places EA 240 farthest from threat emitter system 160, optimum for EA safety while providing protective jamming. As another example, EA 260 is the sole EA and is positioned outside of JAR contours 250, 230 and 215. EA 260 would be ineffective in jamming threat emitter 160 regardless of the jamming approach employed resulting in threat emitter system 160 detecting and tracking PE 205. PE 205 is now vulnerable to attack.

Optionally, placing the EA 240 within PAS-JAR 230 would enable the PAS jamming approach that would provide adequate protection for PE 205. It should be noted that the PAS jamming approach would place the EA 240 closer to the threat emitter 160.

Optionally, placing the EA 240 within PAO-JAR 250 would enable the PAO jamming approach that would provide adequate protection for PE 205. It should be noted that the PAO jamming approach would place the EA 240 even closer to the threat emitter 160.

Figure 4:
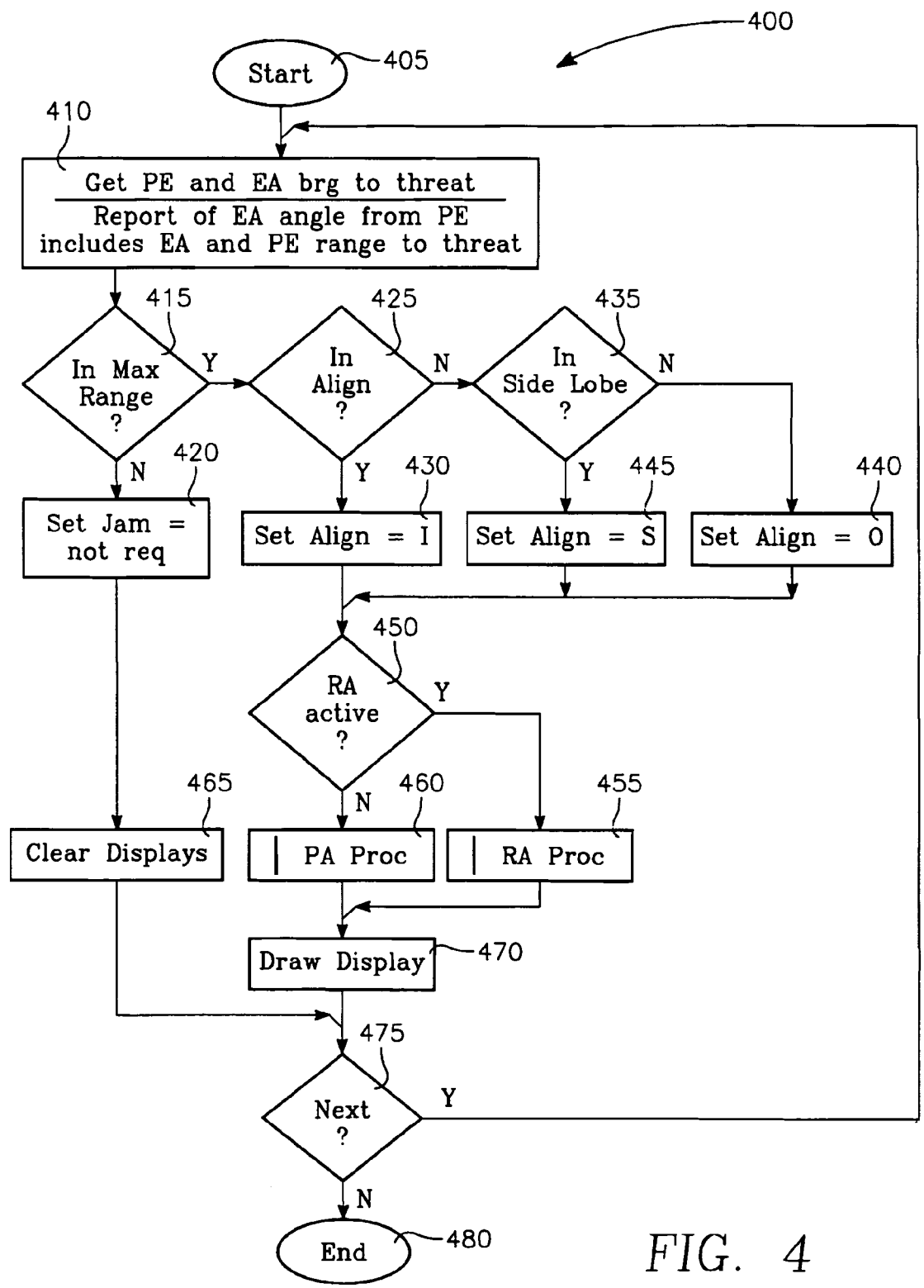
FIG. 4 is a high level software flowchart showing the processing steps for generating the Reactive Assignment and the Preemptive Assignment JAR contours and Jam Assessment Strobe (JAS) displays.

FIG. 4 is a flowchart describing the software processing steps necessary to generate Jam Assessment displays. After program initialization is complete program execution begins, item 405. Own aircraft navigational parameters for the PE and the EA are read into memory buffers where the information is used to initialize navigational parameters. The navigational parameters are provided by a designated suite of aircraft equipment specialized to provide latitude, longitude, aircraft attitude, speed and course. An Electronic Order of Battle (EOB) is a an electronic library of information functioning as a database of information related to the characteristics and locations for threat emitter systems likely to be encountered on a given mission, the expected flight path of the PE and the jamming capabilities of the EA. The EOB is generated during the planning phase of a mission and is derived from sources of intelligence specific to the theater of operation. The EOB is downloaded into computer memory residing in the existing suite of aircraft equipment and is made available to the Jam Assessment software program via designated aircraft interfaces, computers and computer processors. Both the navigational information and the EOB information are used in processing step 410 to determine the PE and EA bearing to the threat emitter and to determine whether the PE lies within the range of the threat emitter system. Processing step 410 is performed with the assumption that the threat emitter is functioning according to the EOB data and the EA is not radiating a jamming signal.

Relying on the bearing relationships between the EA and PE to the threat emitter and the maximum range of the threat emitter, the software performs a check 415 to determine if the PE is within the maximum range of the threat emitter. If the PE is not within the range of the threat emitter a no jam required flag is set 420, the displays are cleared of stale information in step 465, then step 475 determines program end 480 or directs program control to step 410 for a subsequent iteration.

If the PE is within range of the threat emitter, step 425 determines the alignment of the EA, PE and threat emitter. If the result of alignment check 425 is that the EA, PE and threat emitter are in alignment then a flag 430 is set to "I". If alignment check 425 returns an out of alignment result then a side lobe check is made at step 435. If the side lobe check 435 result is positive for the PE being within the side lobe then the alignment flag is set to "S" 445. If the side lobe check 435 is negative the assumption is the EA, PE and threat emitter are Out of alignment and the alignment flag is set to "O" 440.

Figure 5:
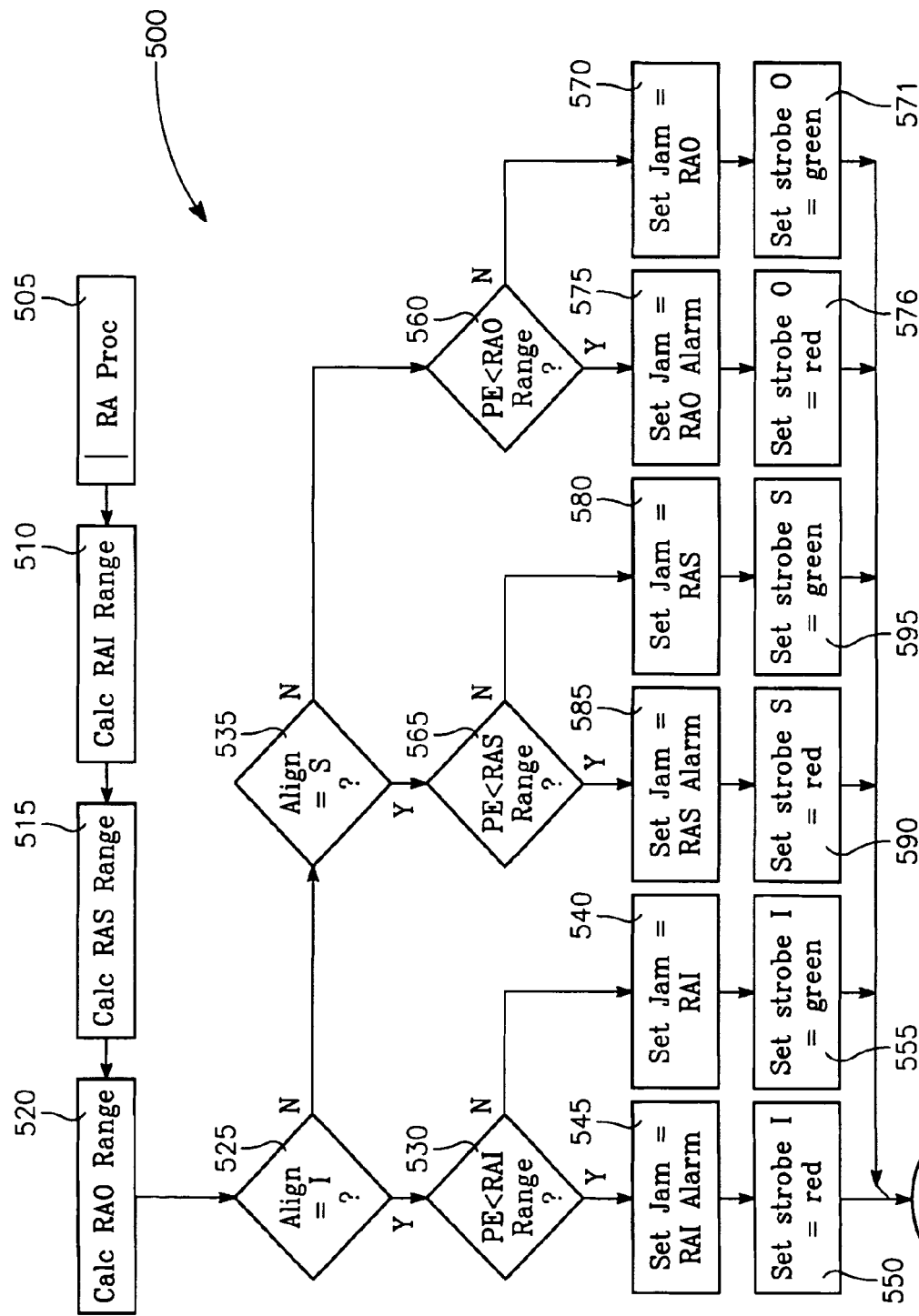
FIG. 5 is a lower level flowchart focusing on the processing steps to generate the Reactive Assignment JAR and JAS information.
Figure 6:
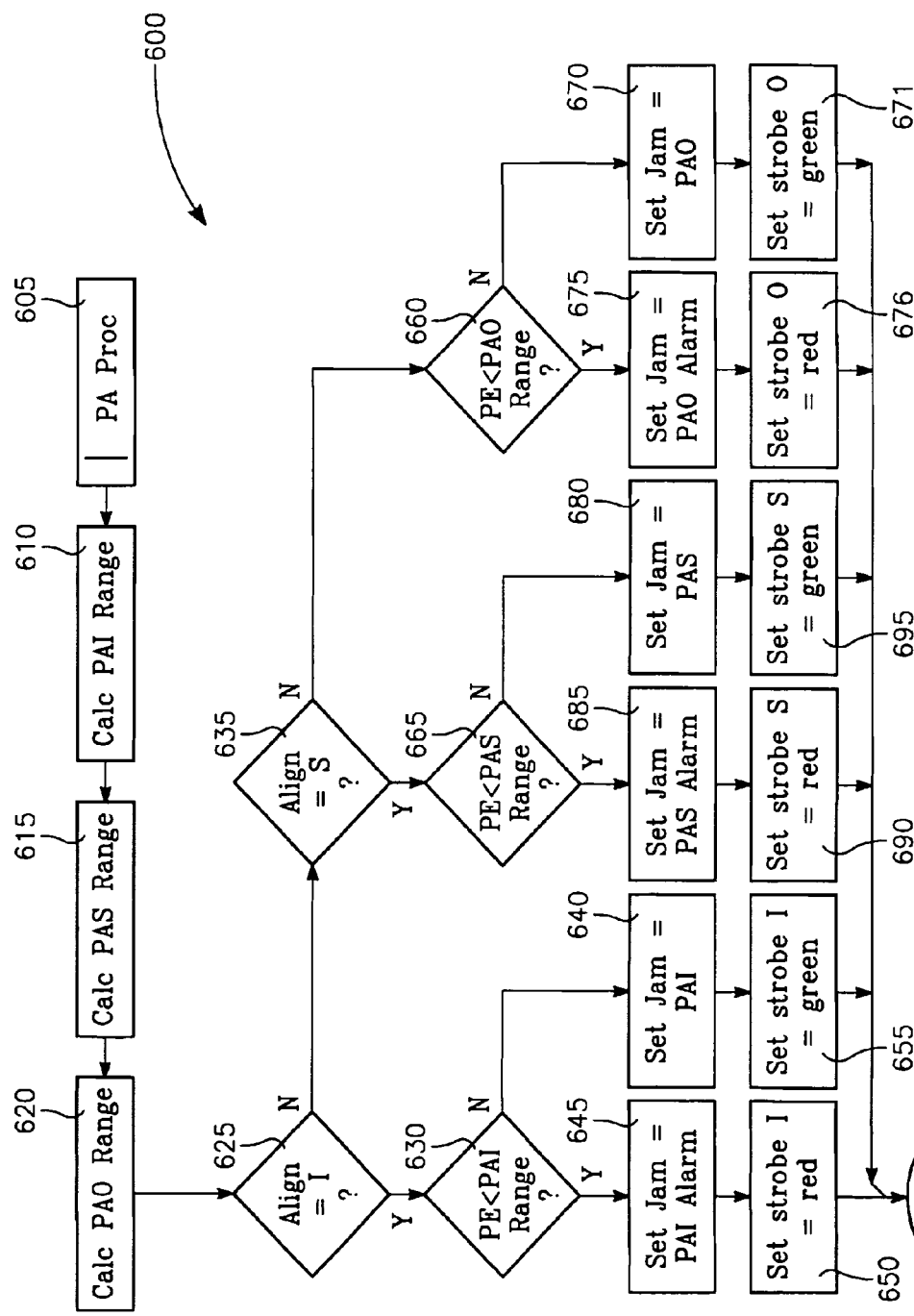
FIG. 6 is a lower level flowchart focusing on the processing steps to generate the Preemptive Assignment JAR and JAS information.

The software must next determine whether to invoke RA processing or PA processing. The software then checks for activation of RA 450, to determine whether the EA has detected a threat emitter waveform. If the result of RA 450 activation check is positive, the threat emitter is not in the EOB, then RA processing 455 is called. Refer to FIG. 5 for a high level flowchart describing RA processing or the detailed description below. If the result of RA 450 check is negative, the threat emitter is in the EOB, then PA processing 460 is called. Refer to FIG. 6 for a high level flowchart of PA processing and the detailed description below. Both RA and PA processing routines return to the same software control point as shown in FIG. 4, a call to draw displays 470. Step 475 then determines program end 480 or directs program control to step 410 for a subsequent iteration.

Figure 13:
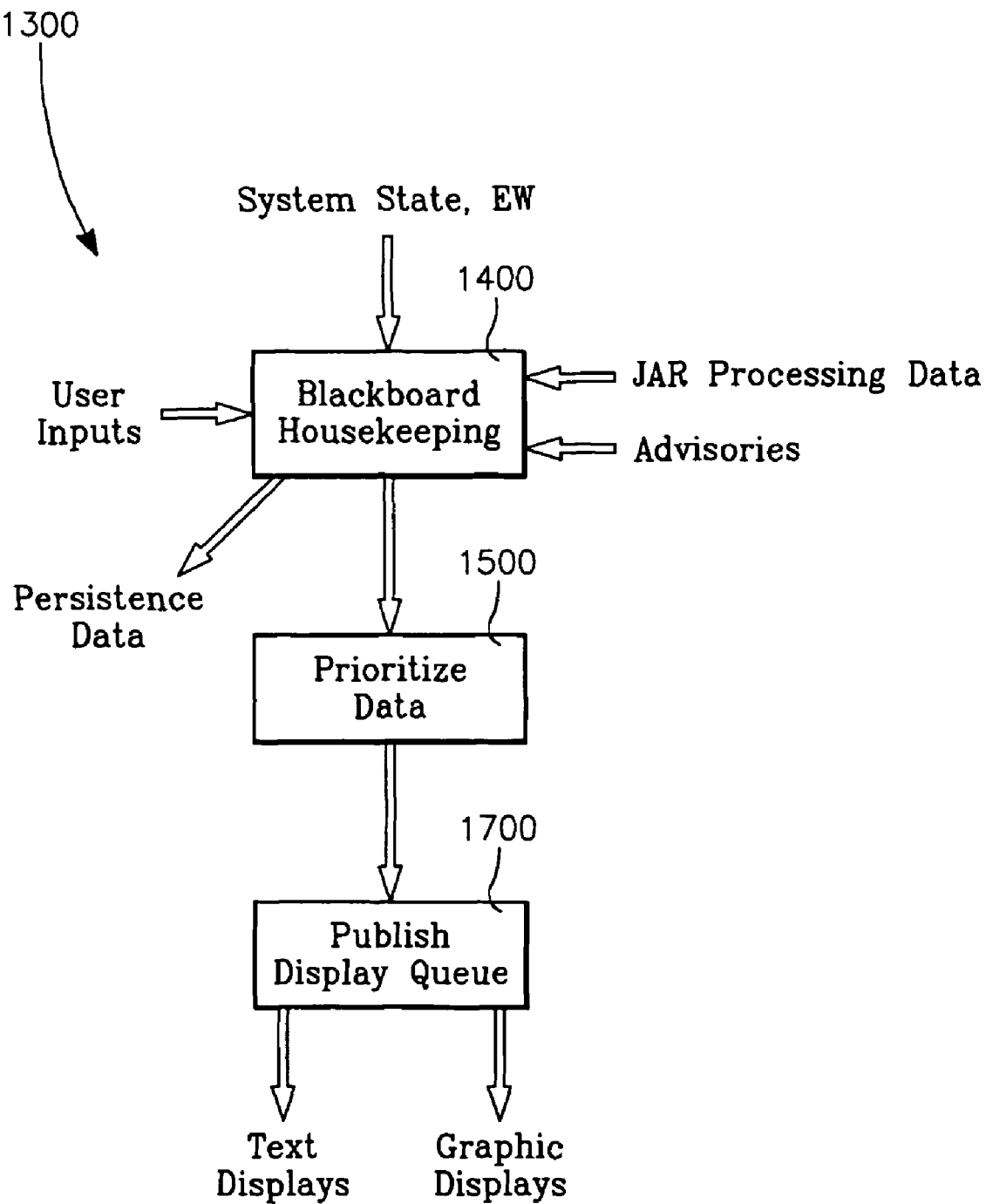
FIG. 13 is a block diagram depicting the high level input and functions of the Display Management routine.
Figure 14:
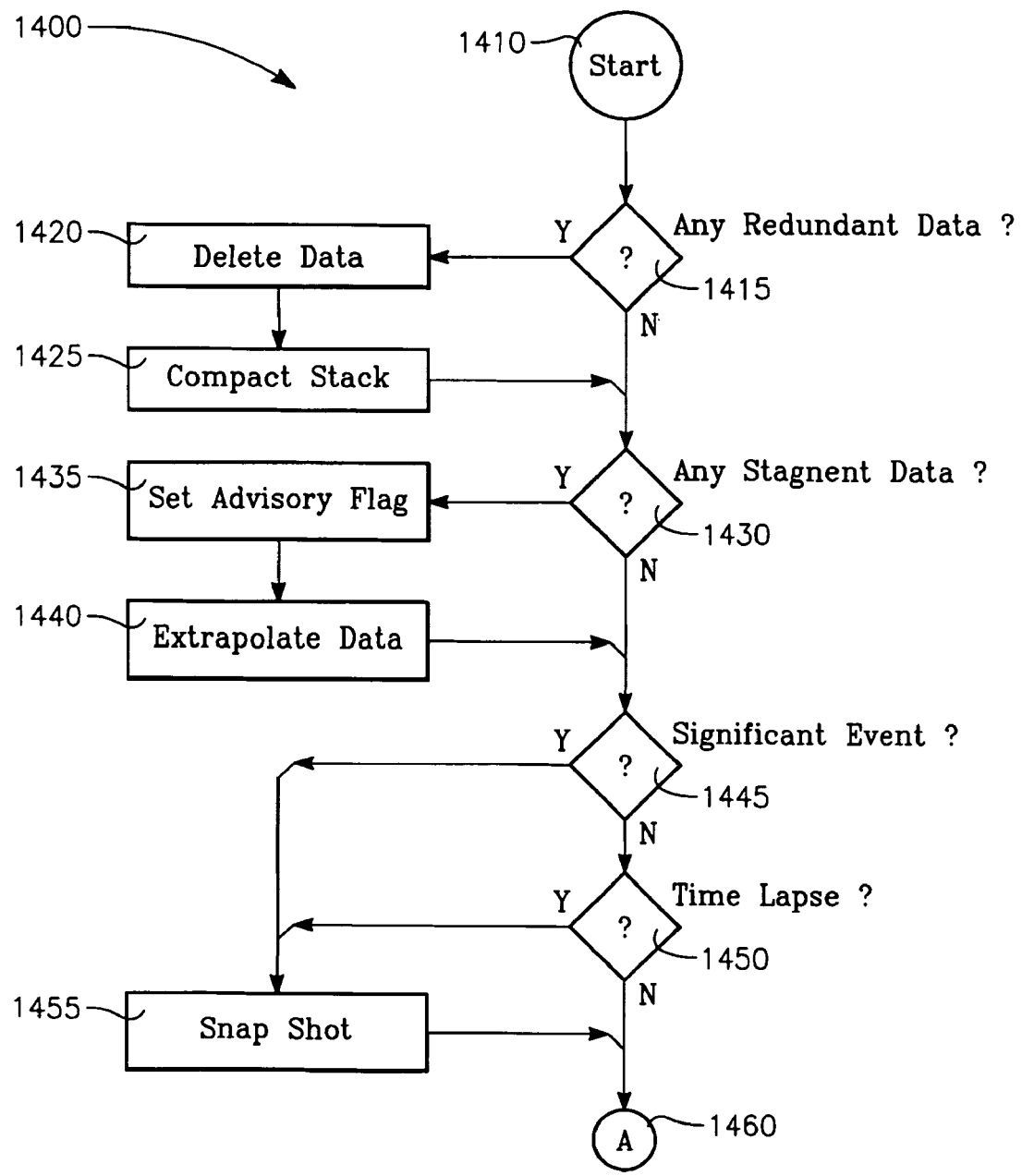
FIG. 14 is a flowchart for the blackboard housekeeping logic that is referenced in the high level functional block diagram in FIG. 13.

The call to draw displays 470 invokes the Display Management routine that is the subject of the high level block diagram in FIG. 13. The JAR and JAS information resides in a series of input buffers updated and accessible to the Display Management routine. The Display Management routine executes in parallel with the JAR processing algorithm using a fixed time interval 1450 (FIG. 14) for bounding a cycle of operation. The Display Management routine is also capable of starting a new cycle due to a significant event 1445 (FIG. 14). The displays built by the Display management routine carry information related to overall EA jamming effectiveness and relative location of the PE and EA to the threat emitter.

Referring to FIG. 4 several flags (steps 440, 445 and 430) correspond to the alignment of the PE and the threat emitter. These flags are common to RA 455 and to PA 460 processing routines and must be set prior to calling either RA or PA processing routines.

Referring to FIG. 5, when RA processing is invoked in step 455 program flow is routed to step 505 and RA processing begins. RA processing continues by first calculating RAI range 510, then calculating RAS range 515 and then calculating RAO range 520. The RAI range 510, the RAS range 515 and the RAO range 520 calculations are performed using the variable definitions and constants particular to each calculation using the Jammer and Tactics Optimization (JATO) power equation 1-1. Each set of constants and variables are based on the critical threat attribute parameters residing in the EOB, real time own aircraft navigational information from the PE and EA aircraft and the characteristics of the specific RA jamming approach.

The variables and constants used in the Jammer and Tactics Optimization (JATO) power equation 1-1 are based on the critical threat attribute parameters residing in the EOB, real time own aircraft navigational information from the PE and EA aircraft, and the characteristics of the specific RA jamming scheme or approach employed.

The limits of threat emitter coverage, in the presence of jamming, obtained from the JATO power equation yield a JAR contour. The definitions for the constants and variables for the JATO power equation 1-1 are provided below.

$$R_{max} = \left\{ \frac{P_R \cdot G_{RT}^2 \cdot \sigma \cdot \lambda^2 \cdot G_m \cdot G_i}{(4\pi)^3 \cdot (S/N)_{min} \cdot L_{RX} \cdot L_{TX} \cdot L_{rp} \cdot B_R \cdot \left[ \begin{array}{c} \left[ k \cdot T \cdot N_f + \left(\frac{\lambda}{4\pi}\right)^2 \sum_{i=1}^{N} \right] \\ \left[ \left(\frac{P_J \cdot G_{JR} \cdot G_{RJ}}{R_J^2 \cdot B_J} \cdot \frac{\Delta M}{L_P \cdot L_J \cdot L_{RX}}\right) \right] \end{array} \right]} \right\}^{1/4}$$

JATO Equation 1-1 where:
$R_{max}$=Maximum effective range for a threat emitter
$P_R$=Receiver Power
$G_{RT}$=Receiver Antenna Gain
$\sigma$=Radar Cross Section
$\lambda$=Wavelength
$G_m$=Modulation Gain
$G_i$=Integration Gain
S/N=Signal to Noise Ratio (Single Pulse)
$L_{RX}$=Receiver Loss
$L_{TX}$=Transmitter Loss
$L_{rp}$=Receiver Processing Loss
$B_R$=Receiver Bandwidth
$k \cdot T \cdot N_f$=constant for transmission noise figure
$P_J$=Jammer Power
$G_{JR}$=Jammer Receiver Antenna Gain
$G_{RJ}$=Jammer Receiver Gain
$R_J$=Range of Jammer
$B_J$=Jammer Bandwidth
$\Delta M$=Modulation Change
$L_P$=Jammer Processing Loss
$L_J$=Jammer Loss The accuracy of $R_{max}$ is dependent upon the accuracy of the critical threat attribute parameters drawn from the EOB, the positional information of the threat emitter system, the positional information of the EA and the EA jamming approach parameters.

Equation 1-1 is a variation of the well known radar range equation. Equation 1-1 is invoked for each jamming approach, for each threat emitter, and for changing PE and EA positions.

FIG. 5 further describes the steps necessary to assemble a JAS representing the RA information. The In alignment flag (I) is checked at step 525 (FIG. 5). If the I flag is set then a check 530 is made to determine whether the PE is within the RAI range of the threat emitter. If the PE is within range of the threat emitter the Jam flag is set to RAI alarm 545, the JAS color is set to red 550 and the RA routine is exited 598. If the PE is not within the range of the threat emitter then the Jam flag is set to RAI 540 and the JAS color is set to green 555 and the RA routine is exited 598. If the I flag was not set then the Side lobe (S) alignment flag is checked 535.

If the S flag is set then a check 565 is made to determine whether the PE is within the RAS range of the threat emitter. If the PE is within range of the threat emitter the Jam flag is set to RAS alarm 585, the JAS color is set to red 590 and the RA routine is exited 598. If the PE is not within the range of the threat emitter then the Jam flag is set to RAS 580 and the JAS color is set to green 595 and the RA routine is exited 598.

If the S flag was not set then the alignment is assumed to be Out of alignment (O). A check 560 is made to determine whether the PE is within the RAO range of the threat emitter. If the PE is within range of the threat emitter the Jam flag is set to RAO alarm 575, the JAS color is set to red 576 and the RA routine is exited 598. If the PE is not within the range of the threat emitter then the Jam flag is set to RAO 570 and the JAS color is set to green 571 and the RA routine is exited 598.

FIG. 6 describes the steps necessary to assemble a JAS representing the PA information. When PA processing is invoked in step 460 (FIG. 4) program flow is routed to step 605 (FIG. 5) and PA processing 605 begins. After calculating the PAI range 610, the PAS range 615 and the PAO range 620 the in alignment flag (I) is checked at step 625. If the I flag is set then a check 630 is made to determine whether the PE is within the PAI range of the threat emitter. If the PE is within range of the threat emitter the Jam flag is set to PAI alarm 645, the JAS color is set to red 650 and the PA routine is exited 698. If the PE is not within the range of the threat emitter then the Jam flag is set to PAI 640, the JAS color is set to green 655 and the RA routine is exited 698. If the I flag was not set then the Side lobe (S) alignment flag is checked 635.

If the S flag is set then a check 665 is made to determine whether the PE is within the PAS range of the threat emitter. If the PE is within range of the threat emitter the Jam flag is set to PAS alarm 685, the JAS color is set to red 690 and the PA routine is exited 698. If the PE is not within the range of the threat emitter then the Jam flag is set to PAS 680 and the JAS color is set to green 695 and the PA routine is exited 698.

If the S flag was not set then the alignment must be Out of alignment (O). A check 660 is made to determine whether the PE is within the PAO range of the threat emitter. If the PE is within range of the threat emitter the Jam flag is set to PAO alarm 675, the JAS color is set to red 676 and the PA routine is exited 698. If the PE is not within the range of the threat emitter then the Jam flag is set to PAO 670 and the JAS color is set to green 671 and the PA routine is exited 698.

Referring to FIG. 4, RA 455 and PA 460 processing routines return control to the draw display routine 470 providing the information necessary to draw the JAR and the JAS. The information to draw the JAR and JAS is in a format suitable for further processing by the designated aircraft display processor. Once the boundaries of the JAR contours and jamming effectiveness are determined any number of user defined displays may be used to present the information to the EA aircrew.

Typical displays are JARs with PE and EA positions plotted with respect to their last known or extrapolated position and a color coded Jam Assessment Strobe (JAS) indicating jamming effectiveness. The length of the JAS represents the maximum effective range for a threat emitter experiencing EA jamming. Each jamming scheme or approach (RAO, RAI, RAS, PAO, PAS, PAI) affects the maximum detection range of the emitter adversely. Color coding the JAR contours and JAS is a user preference and is limited by the display processor and the properties of the display hardware residing in the EA aircraft.

Figure 3:
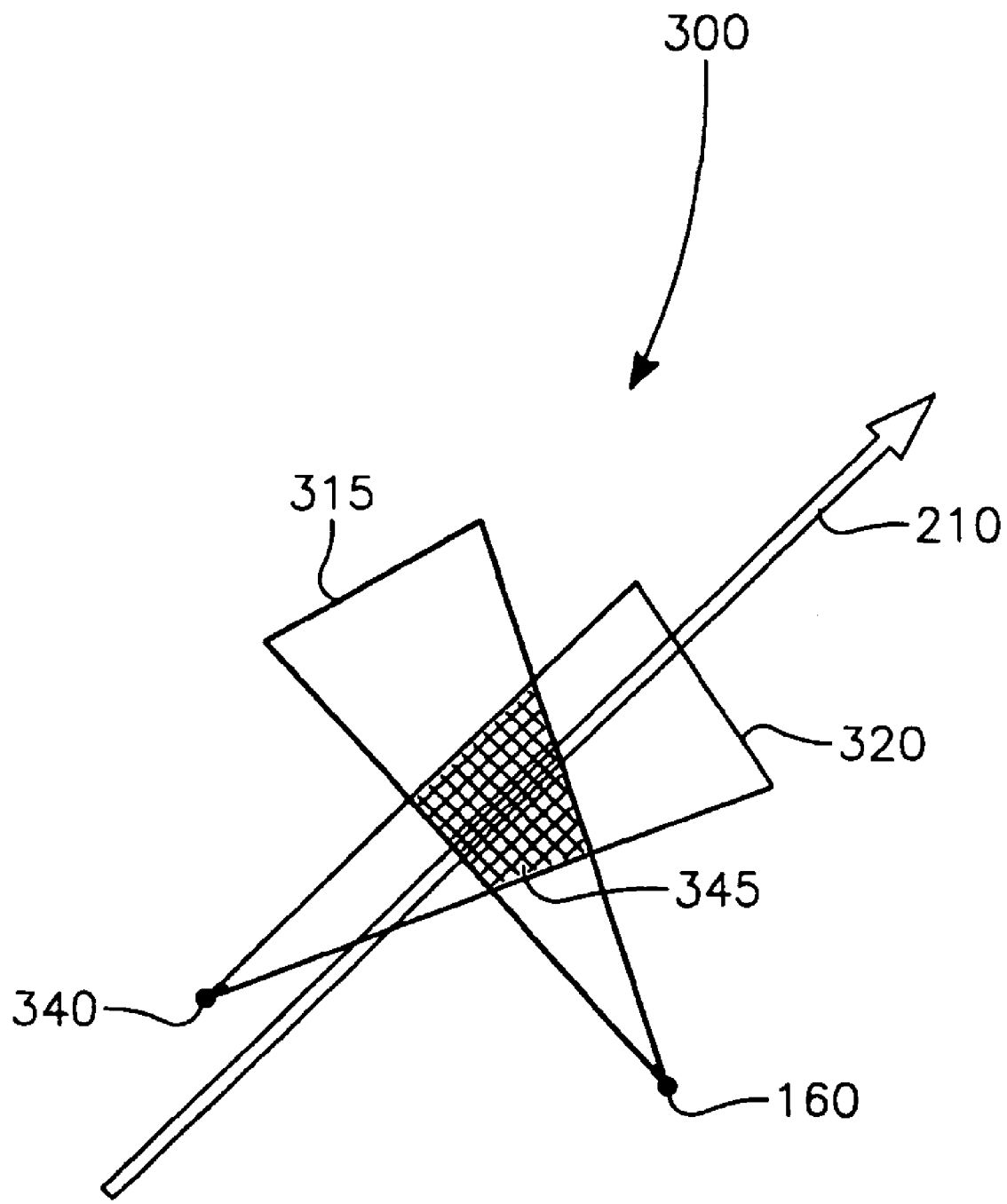
FIG. 3 is a drawing showing multiple threat emitter systems and the JAR overlap area.

In the event multiple threat emitters have overlapping coverage the overlap volume can be determined. Refer to FIG. 3 for a two dimensional representation of the JAR overlap volume for two threat emitters. Threat emitter 160 is associated with JAR 315 while threat emitter 340 is associated with JAR 320. Each point within every JAR has a three dimensional coordinate corresponding to latitude, longitude and altitude. Using EOB data for azimuth and elevation scan limits, the maximum effective range of emitter coverage, positional information describing the latitude, longitude and altitude for a given threat emitter, allows points in common between multiple JARs to be compared. The comparison of JAR points results in common points between the JARs to be identified and used to define an overlap in threat emitter coverage areas. Plotting EA flight path 210 through the threat emitter coverage allows assessment of the EA position with respect to jamming effectiveness. This method of determining the JAR overlap area can be expanded to include any number of threat emitters having overlapping coverage and is only limited by the processing throughput of the interfaces and computers in the EA aircraft.

Figure 7:
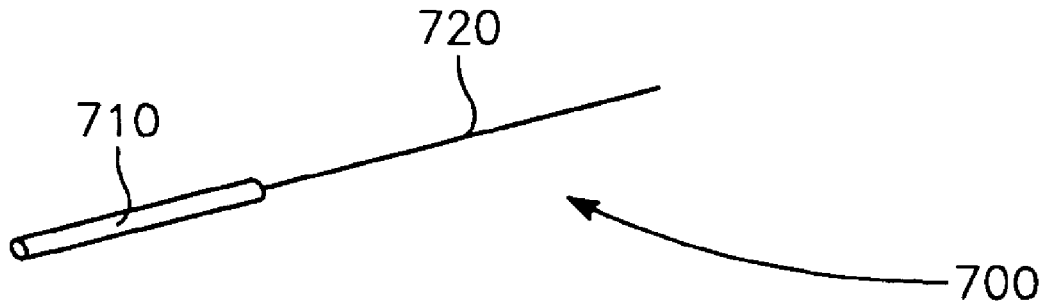
FIG. 7 is a drawing showing the segments that make a JAS.

Referring to FIG. 7, segment 710 represents the current effective (Jammed) range, and segment 720 represents the un-jammed range of the threat emitter. The JAS orientation represents the geometric relationship between the PE and the threat emitter.

Figure 8:
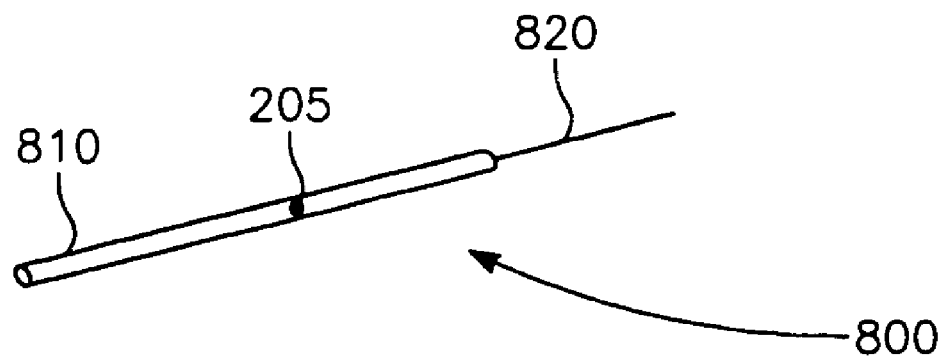
FIG. 8 is a drawing showing JAS and a PE that is detectable by a threat emitter

Referring to FIG. 8, JAS 810 has a length that passes through PE 205 indicating that PE 205 is within the detection range of the threat emitter. JAS 810 would be color coded to indicate that PE 205 is not vulnerable to attack because jamming is effective. FIG. 8 represents the scenario in which the EA is effective despite the PE position within the PAI range of the threat emitter. In the event that PE 205 drifts into line segment 820 which results in jamming not being effective, the EA aircrew is prompted to either: maneuver to address the threat, use other tactical options such as change jam techniques, deploy a kinetic weapon, or advise the PE to maneuver further away from the threat.

Figure 9:
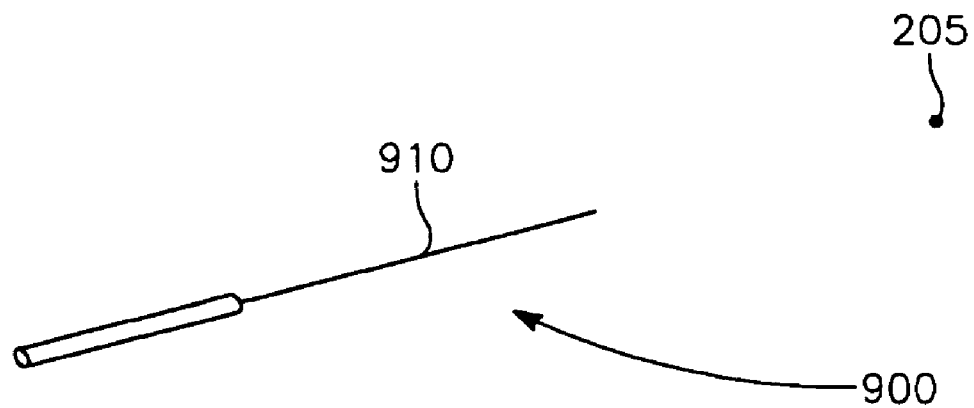
FIG. 9 is a drawing showing a JAS and a PE that is not detectable by a threat emitter system.

Referring to FIG. 9, JAS segment 910 has a length that is short of PE 205 indicating that PE 205 is not within the detection range of the threat emitter. JAS 910 would be color coded to indicate that PE 205 is not vulnerable to attack.

Figure 10:
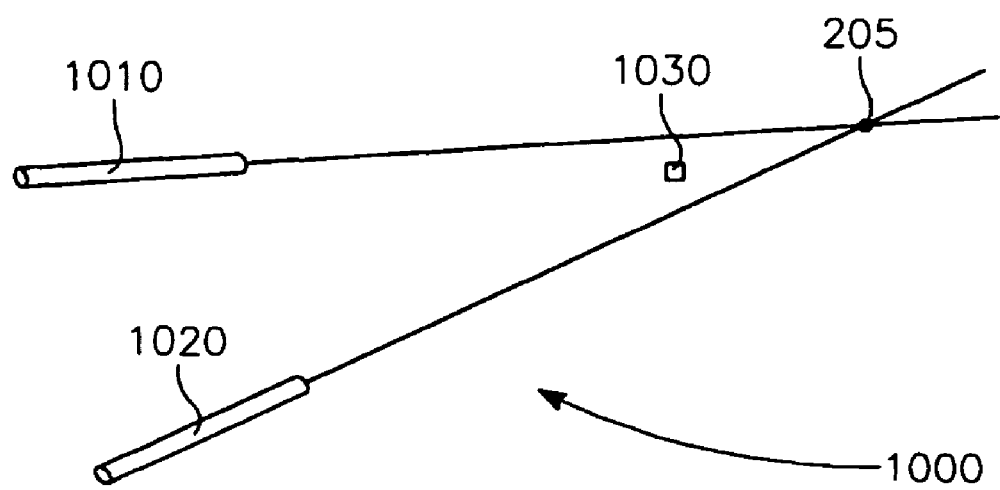
FIG. 10 is a drawing showing two JAS, an effective EA and a protected PE in a representative graphical format.

Another embodiment of this invention generates a display format as depicted in FIG. 10. JAS 1010 and JAS 1020 represents jamming employed by EA 1030 which is positioned in the JAR overlap area of the two threat emitters. In this configuration JAS 1010 and JAS 1020 would be color coded green indicating that PE 205 is not vulnerable to detection by either threat emitter.

Figure 11:
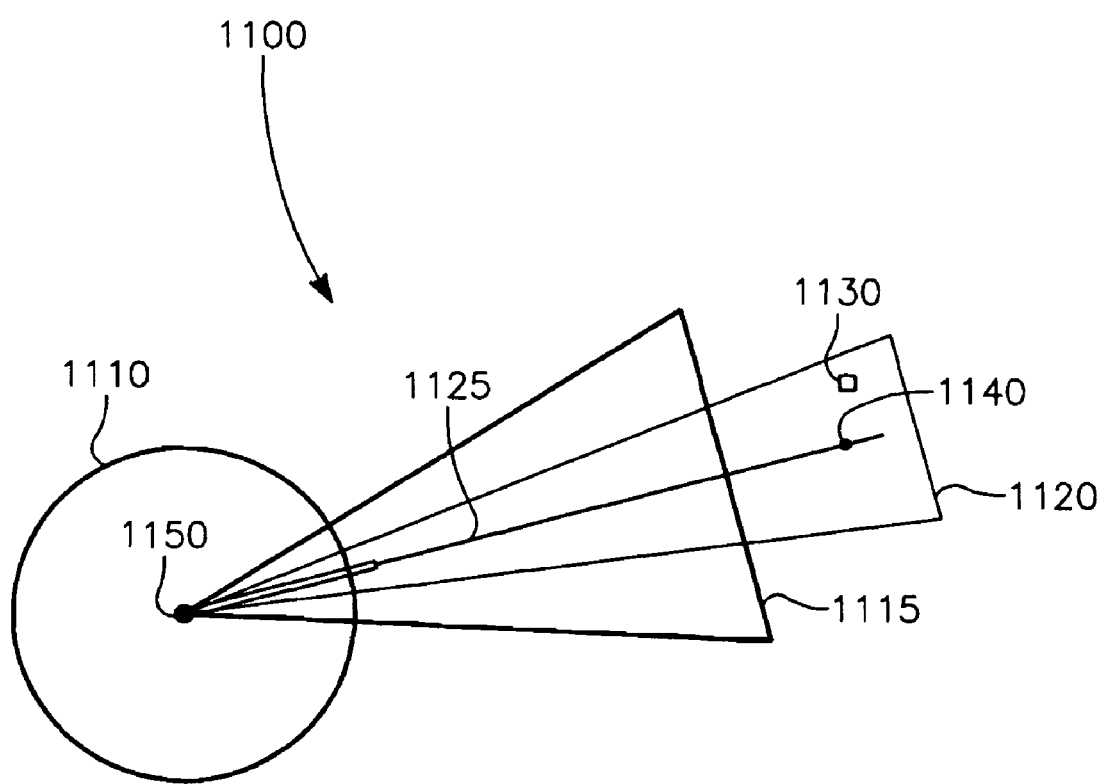
FIG. 11 is a drawing of a combined JAR, JAS, EA and protected PE in a representative graphical format.

FIG. 11 depicts another display embodiment combining the JAR and JAS information with the relative positions of EA 1130 and PE 1140. The explanation for FIG. 11 is applicable to either the PA or RA jamming technique. Assume EA 1030 is positioned within the In alignment JAR 1120 employing the PAI jamming approach. JAS 1125 calculated for the PAI jamming approach falls short of PE 1140 and would be colored green indicating that PE 1140 is not vulnerable to attack. At a glance the aircrew can determine that PE 1140 is safe from detection by threat emitter 1150 and that EA 1130 could maneuver anywhere within JAR 1120 while employing PAI jamming and remain effective in protecting PE 1140. Equally important, is the situational awareness that shifting to the PAS jamming approach and maneuvering EA 1130 into JAR 115 would provide adequate protection for PE 1140. Equally important is the situational awareness that shifting to PAO jamming and maneuvering into JAR 1110 would also provide protection for PE 1140. FIG. 11 provides critical information to the EA aircrew in a format that is easy to understand, is used to ascertain jamming effectiveness and improves the ability to adapt to changing conditions. The capability to assess jam effectiveness as described in the preferred embodiment fills a need unmet by the current aircraft displays.

Figure 12:
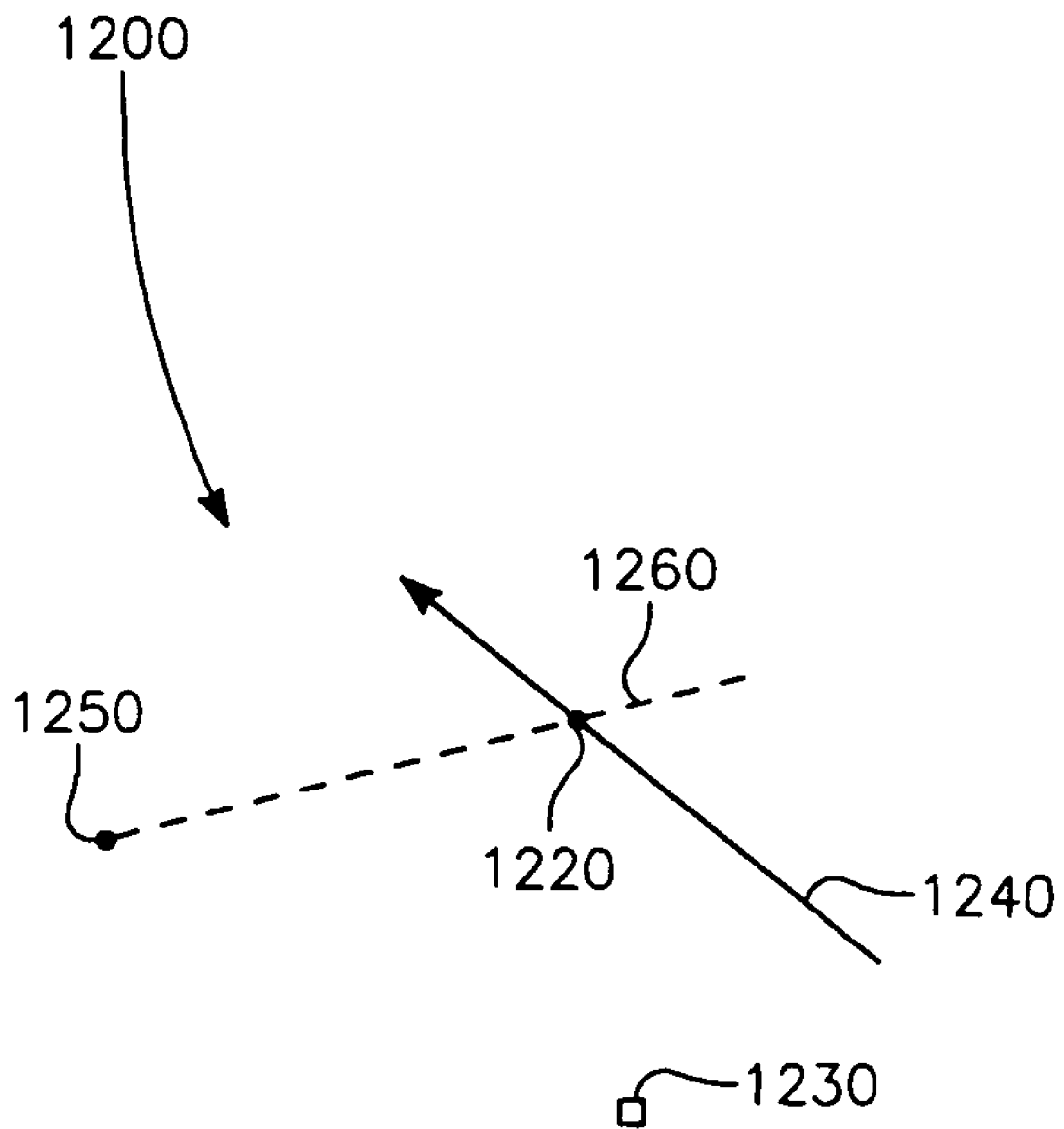
FIG. 12 is a drawing of undesignated threat emitters.

Providing information to the EA aircrew related to detected threat emitters not currently assigned a jamming approach is critical to overall situational awareness. FIG. 12 represents the scenario in which threat emitter 1250 has been defined by the EA 1230 and an assessment of PE 1220 vulnerability has been made along flight path 1240. At this point threat emitter 1250 has not been assigned a jamming approach, as indicated by the dashed segment 1260. At a glance, EA 1230 is able to determine that threat emitter 1250 is a threat that requires EA 1230 jamming or that flight path 1240 needs to be altered to avoid detection.

This specification has described in detail the algorithm to generate different JAR and JAS graphical elements as well as the information suitable for display in a textual format. The specification now turns to the detailed description of the Display Management routine.

Referring to FIG. 13, in general the Display Management routine is comprised of multiple distinct tasks. The first task is the Blackboard Housekeeping task 1400 which uses as input JAR Processing generated data, advisory data, system state information and user inputs. The results of the Blackboard Housekeeping task 1400 are used as input to the Prioritize Data task 1500 which assures that time critical events are processed first. The results of the Prioritize Data task 1500 are fed to the Publish Display Queue task 1700 which provides the information to drive the display units and to perform the lower priority tasks of display maintenance. The output of the Publish Display Queue task 1700 are used to drive platform display processors which present information as depicted in the representative displays of FIG. 17 and FIG. 18. Operation of the Display Management routine (FIG. 13) will now be described in detail.

In general, the Blackboard Housekeeping task 1400 (FIG. 13) assures that the EW system state information and external environment data elements are within data senescence limits while eliminating any unnecessary redundant data. Referring to FIG. 14, the Blackboard Housekeeping task is initiated 1410 by a call from the JAR Processing algorithm 470 (FIG. 4). Asynchronous reports from various aircraft subsystem and jamming system components are read from a series of input buffers and stored in a single unified data structure that facilitates random access to data elements and supports system persistence.

System persistence is the ability of the overall Display Management routine to recover to the last known state using a data snap-shot 1455. The data snap-shot is stored in short term memory and is composed of attributes and values necessary to restore display functionality in the event of a system reset or catastrophic loss of real-time data. The data snap-shot is also stored in long term digital memory to support post flight analysis and assessment of EW system operation.

The Blackboard Housekeeping functionality includes a check for redundant data 1415 and then deletes any redundant data 1420. Stack manipulation 1425 is then performed to assure that an accessed data element is the appropriate data element. Stack manipulation 1425 is also necessary if a First-In-First-Out (FIFO) array of limited size is required or if a specific time-out for data senescence is needed. A check for any stagnant data 1430 in the stack is then performed. This stagnant data check 1430 sets an advisory 1435 indicating that data extrapolation is necessary 1440 for aged but usable data. It is well known within the state of the art that velocity and acceleration information are used to extrapolate a known aircraft position over a given length of time to determine a new position for the aircraft. A check is then made to determine if a significant event 1445 has occurred.

A significant event is an event that has an impact upon the role of the EA in protecting the PE. A significant event may be the change in operational status of a key piece of the EW suite, a weapon failure, a sudden change in status of a PE, a sudden change in the threat emitter characteristics or detection or loss of a threat emitter system. If a significant event has occurred than a snap-shot 1455 is taken and stored as persistence data for storage in short term memory and storage in long term memory on a digital recording medium.

The snap-shot 1455 of system activity is also taken periodically and is controlled by a snap shot timer which is checked for a time out. If the snap shot time out has not occurred program execution continues 1460. If the snap shot timer has timed out then a snap shot 1455 is taken, after which program flow continues 1460.

It should be noted that the own aircraft navigation updates are a nominal 1 second rate and thus becomes the primary candidate for the execution time limit for the Blackboard Housekeeping task.

The basis for user interaction with the Display Management routine is through the use of a rotary of user options enabled by a push-tile. A push-tile is a hardware button that is integral to a multi-function display unit. A push-tile is software programmable in function and labeling. Numerous push-tiles surround the display area of the display unit to accept user commands to control display formats and for operating aircraft systems. A push-tile button is immediately adjacent to the label that defines the push-tile function. The push-tile buttons are not shown in the Figures as the quantity, spacing, size and appearance of push-tile buttons vary according to the size of the display unit and is unique to each manufacturer.

The software to support push-tile function definition and labeling is unique to the display unit that resides in the aircraft cockpit. Configuring the push-tile labels and configuring the push-tiles to control functions are necessary to implement the invention's preferred embodiment and are documented by the display unit manufacturer.

Figure 17:
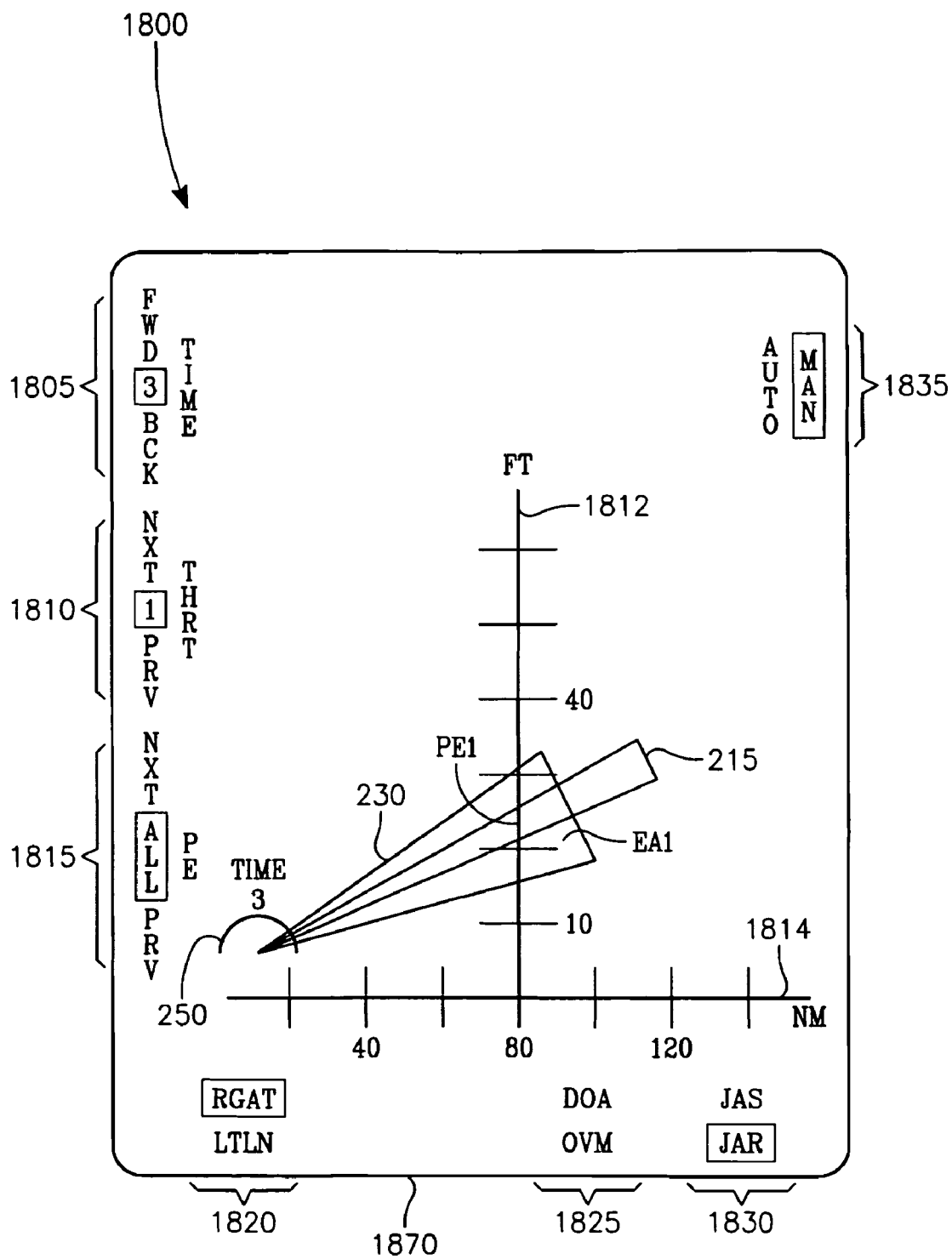
FIG. 17 is a drawing containing a representative display format using graphical cues and text generated by the integrated display management routine using the results of the JAR processing algorithm.
Figure 18:
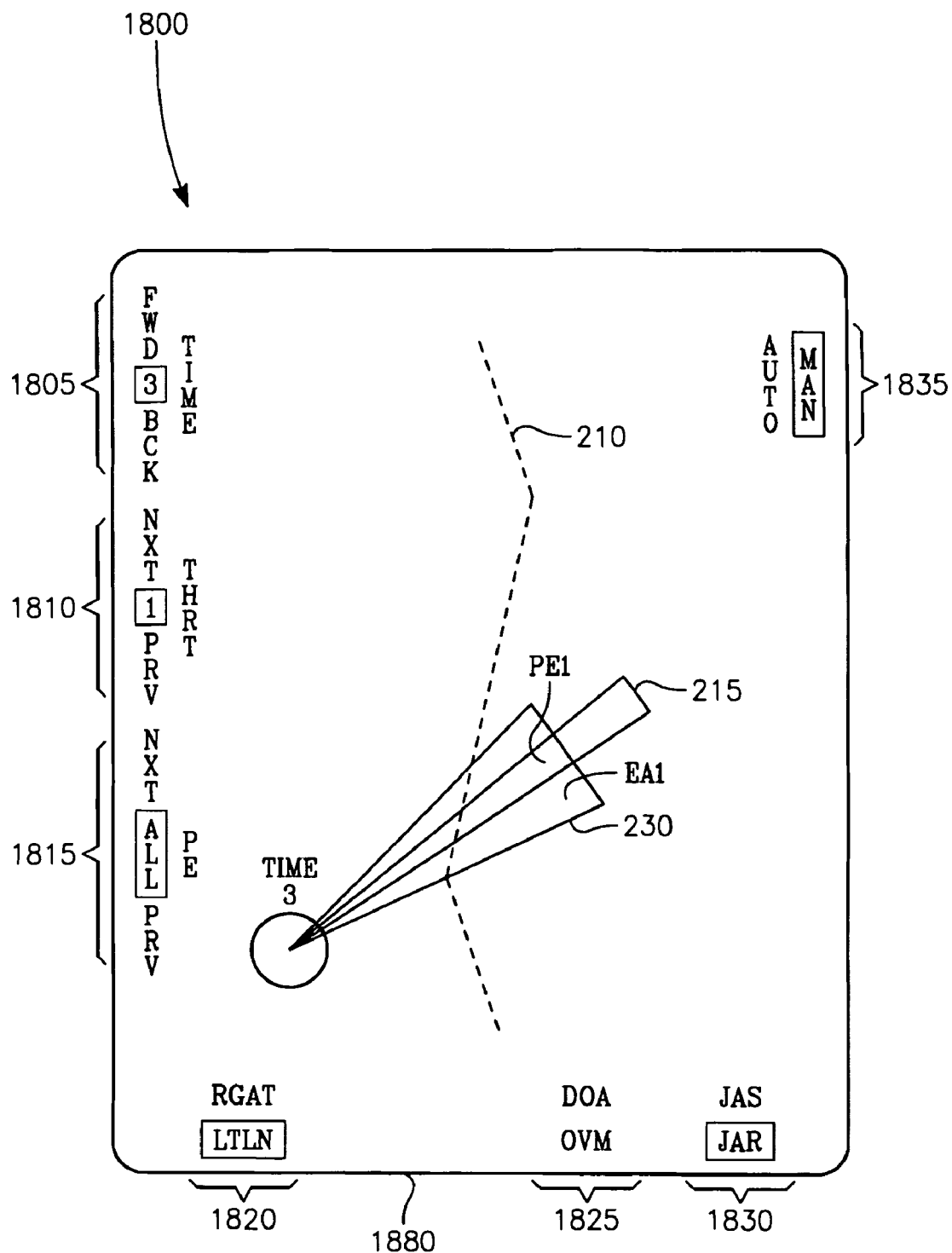
FIG. 18 is a drawing containing a second representative display format using graphical cues and text generated by the integrated display management routine using the results of the JAR processing algorithm.

In the preferred embodiment, a user is provided positive feedback that a push-tile depression is acknowledged by observing a display update, observing a change in the box surrounding a label corresponding to a given push-tile position or both. For the preferred embodiment, FIG. 18 represents a default display format providing the user an option of selecting between either a range and altitude display (RGAT) format or a latitude and longitude format (LTLN) (item 1820). When the user depresses the push-tile (not shown) directly below item 1820 the display transitions to that of FIG. 17, the RGAT format with RGAT (item 1820) boxed. A subsequent depression of the push-tile directly below item 1820 transitions the display format to a range and bearing format (not shown) or to any other user defined format. This concept is best described as a rotary of display formats enabled by repeated depression of a single push-tile. The push-tile rotary concept is key to the operation of the Display Management routine. A push-tile may also be configured to operate as an off and on switch to enable a single user defined command.

As previously discussed, the JAR processing is capable of generating information related to the position of the EA and PE relative to a threat emitter. Additionally, multiple overlapping JARs can be generated for display. All of this information is available for display in flexible formats that are configured by the user.

Figure 15A:
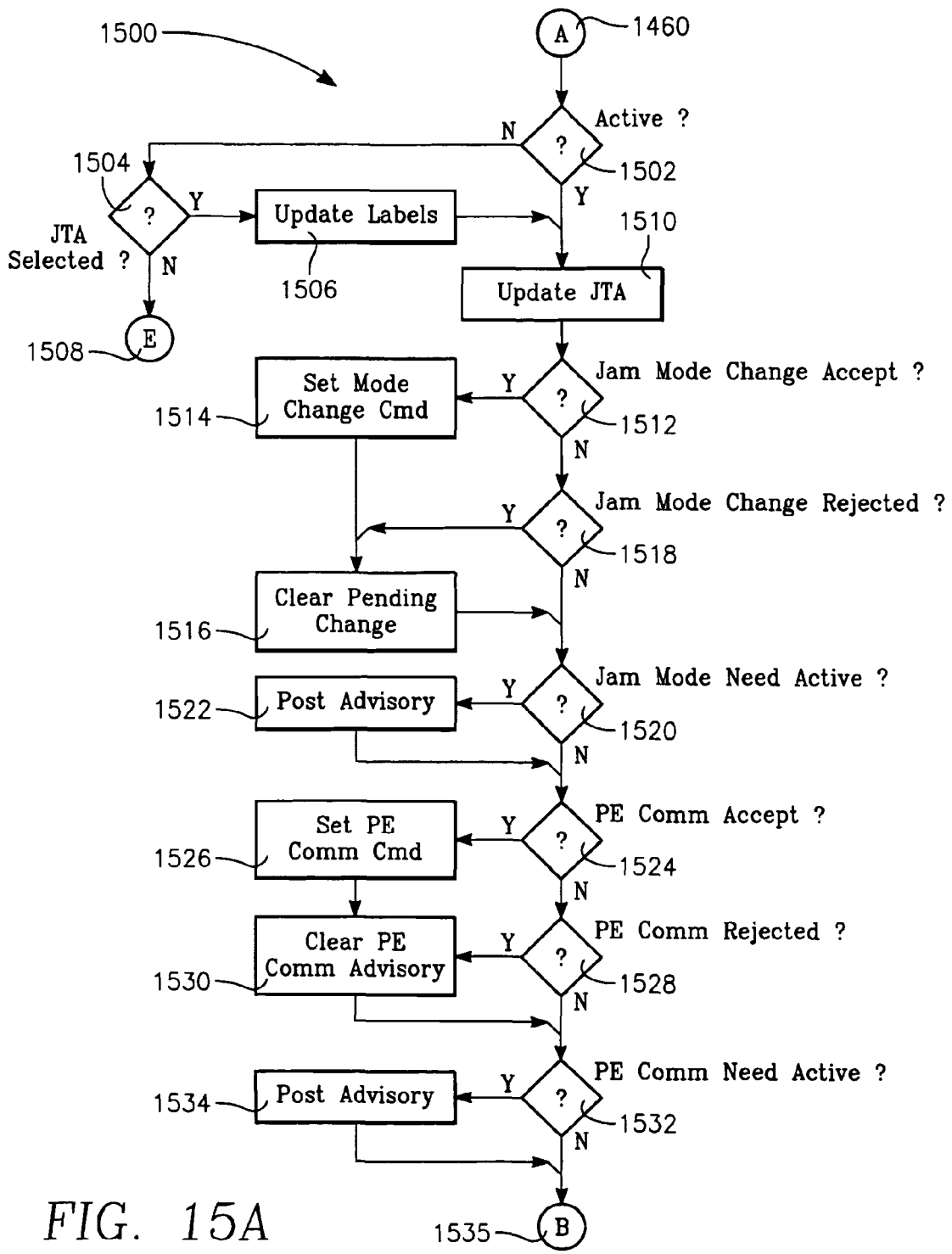
FIG. 15A is a first part of a flowchart for the display logic that is referenced in the high level functional block diagram in FIG. 13.
Figure 15B:
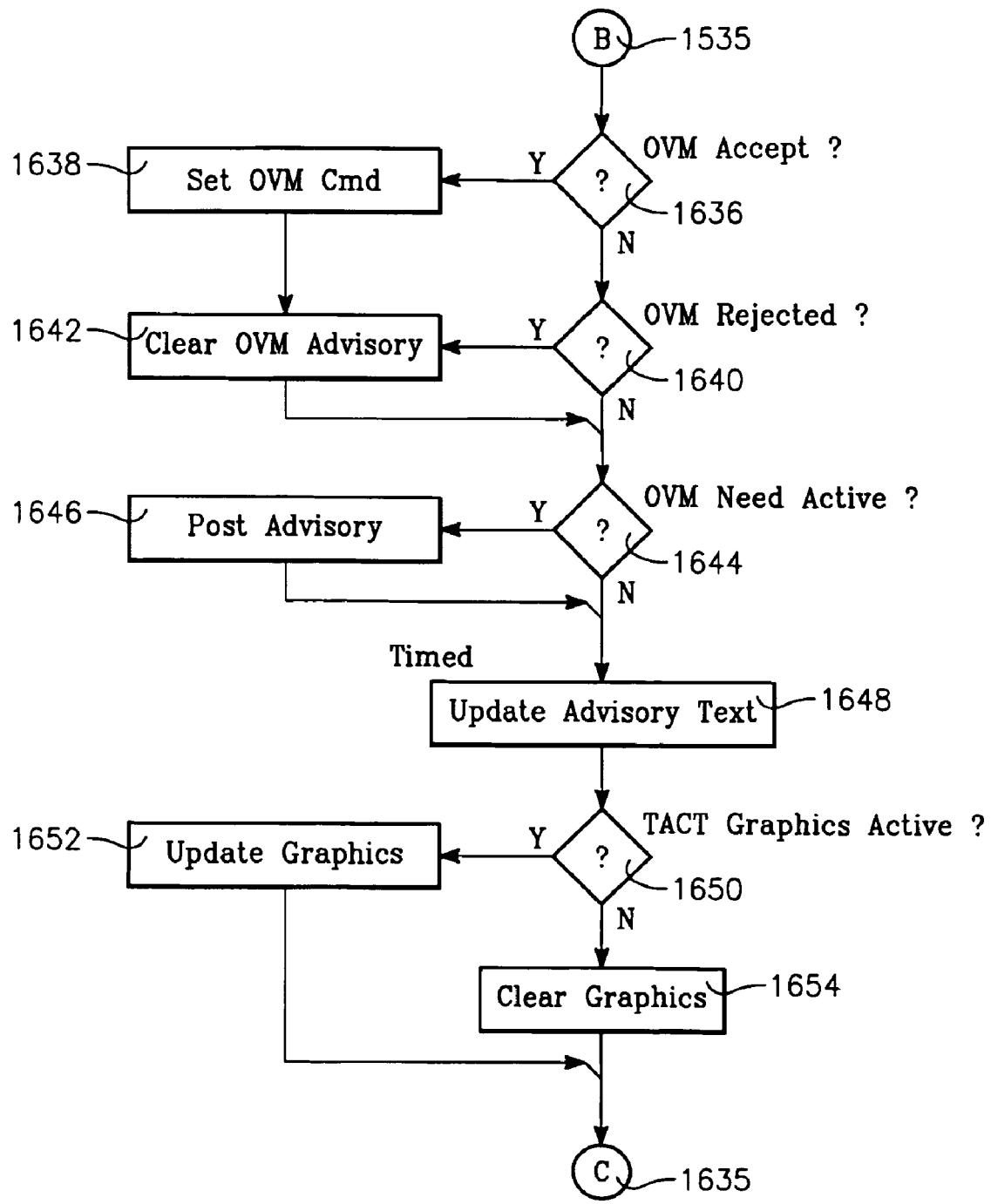
FIG. 15B is a second part of a flowchart for the display logic that is referenced in the high level functional block diagram in FIG. 13.
Figure 15C:
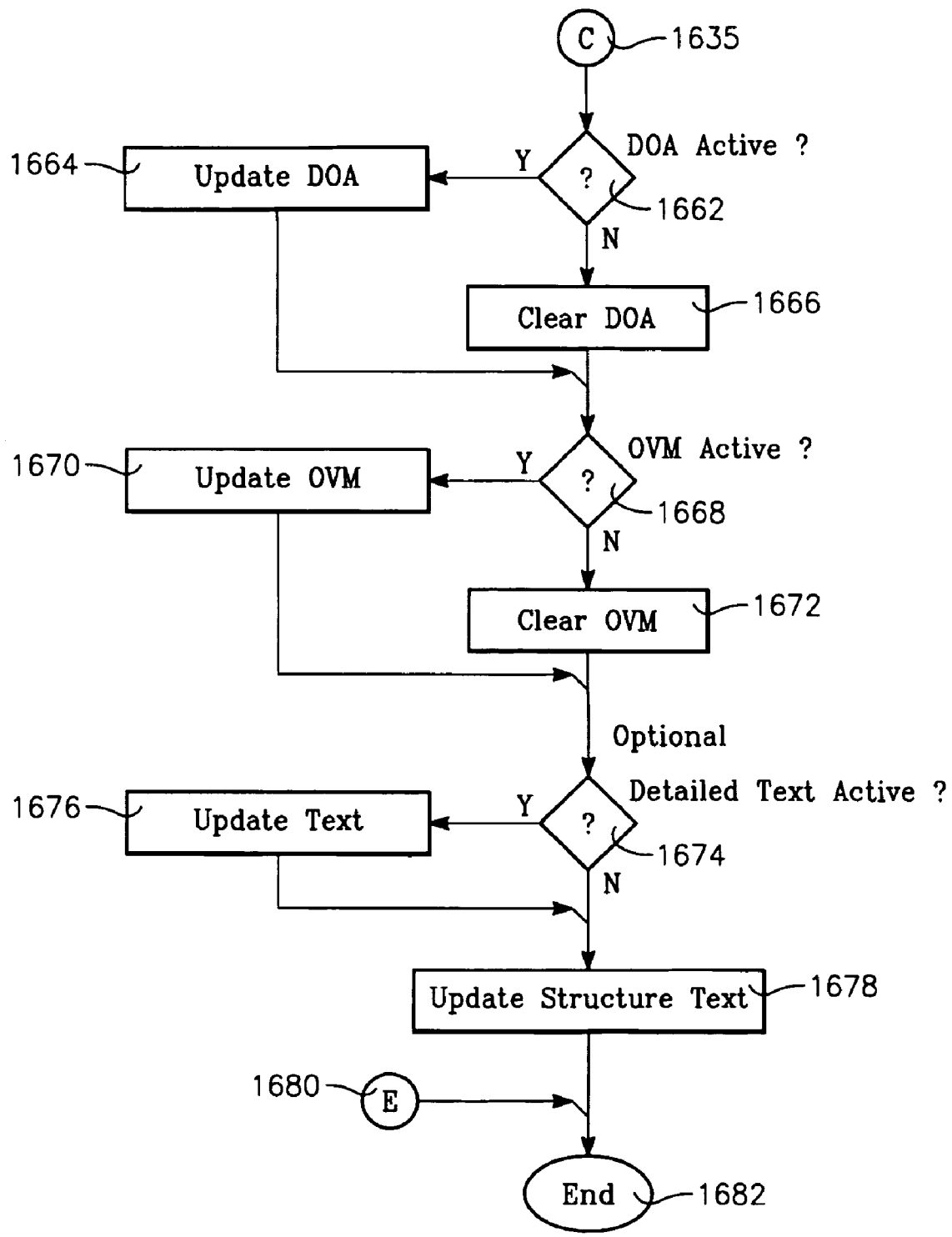
FIG. 15C is a third part of a flowchart for the display logic that is referenced in the high level functional block diagram in FIG. 13.

Together FIGS. 15A, 15B and 15C, comprise a software flowchart for the Prioritize Data task 1500 (FIG. 13) and Publish Data Queue task 1700 (FIG. 13) and describe the overall design and the steps necessary to prepare the information received from the Blackboard Housekeeping task 1400 (FIG. 13) for display in flexible display formats defined by the user.

A primary function of the Display Management routine is to process time critical user commands for displaying the information to assess jam effectiveness as well as to command changes in the type of jamming employed by the EW aircraft. The Prioritize Data logic is based on categories such as Time Critical, Mandatory Timed, Mandatory Acknowledge, and Optional. The Prioritize Data logic sets a prioritized order for designated display fields: labels, structural text, Jam Threat Assessment text, advisory text (heading, altitude, speed, jam mode, etc.) and graphics elements such as EA and PE planned routes, projected positions, Threat Assessment Strobes, JAR volumes. Each display element falls into one of several priority categories listed in Table 1. The display elements in Table 1 are discussed in detail and defined later in this specification.

TABLE 1

Priority Categories

| Time Critical | Mandatory Acknowledge | Mandatory Timed | Optional |
|---|---|---|---|
| Label status | Jam Mode Change | Advisory Text | Structure Text |
| Jam Threat Assessment | PE Comm. | Graphics Elements | Detailed Text |
| | OVM Advisory | JAR Volumes DOA Elements OVM Elements | |

Each display element in Table 1 is then assigned a relative value as described in Table 2, Relative Significance, which allows a processing priority list to be generated. This Relative Significance priority list assures that the higher priority display elements that impact mission safety and success are processed before any other lower priority display elements.

TABLE 2

Relative Significance

| | Time Critical | Mandatory Acknowledge | Mandatory Timed | Optional |
|---|---|---|---|---|
| Priority | 1 | 2 | 3 | 4 |

Prior to the start of prioritizing data a check 1502 (FIG. 15A) is made to determine if the Electronic Combat Decision Support System (ECDSS) is actively engaged in combat support processing. If the ECDSS is not active a check 1504 (FIG. 15A) will be made to determine if the Jam Threat Assessment (JTA) displays have been selected by the aircrew. The JTA displays are the series of linked formats generated by the Display Management routine. If the JTA displays are selected then the JTA labels and advisories are updated 1506 (FIG. 15A) and time critical processing begins. If the JTA displays are not selected 1508 (FIG. 15A) then control is routed to the end of the flowchart 1680 (FIG. 15C). If the check 1502 (FIG. 15A) for ECDSS is active then the JTA advisories are updated 1510 (FIG. 15A) and time critical processing begins.

Figure 16:
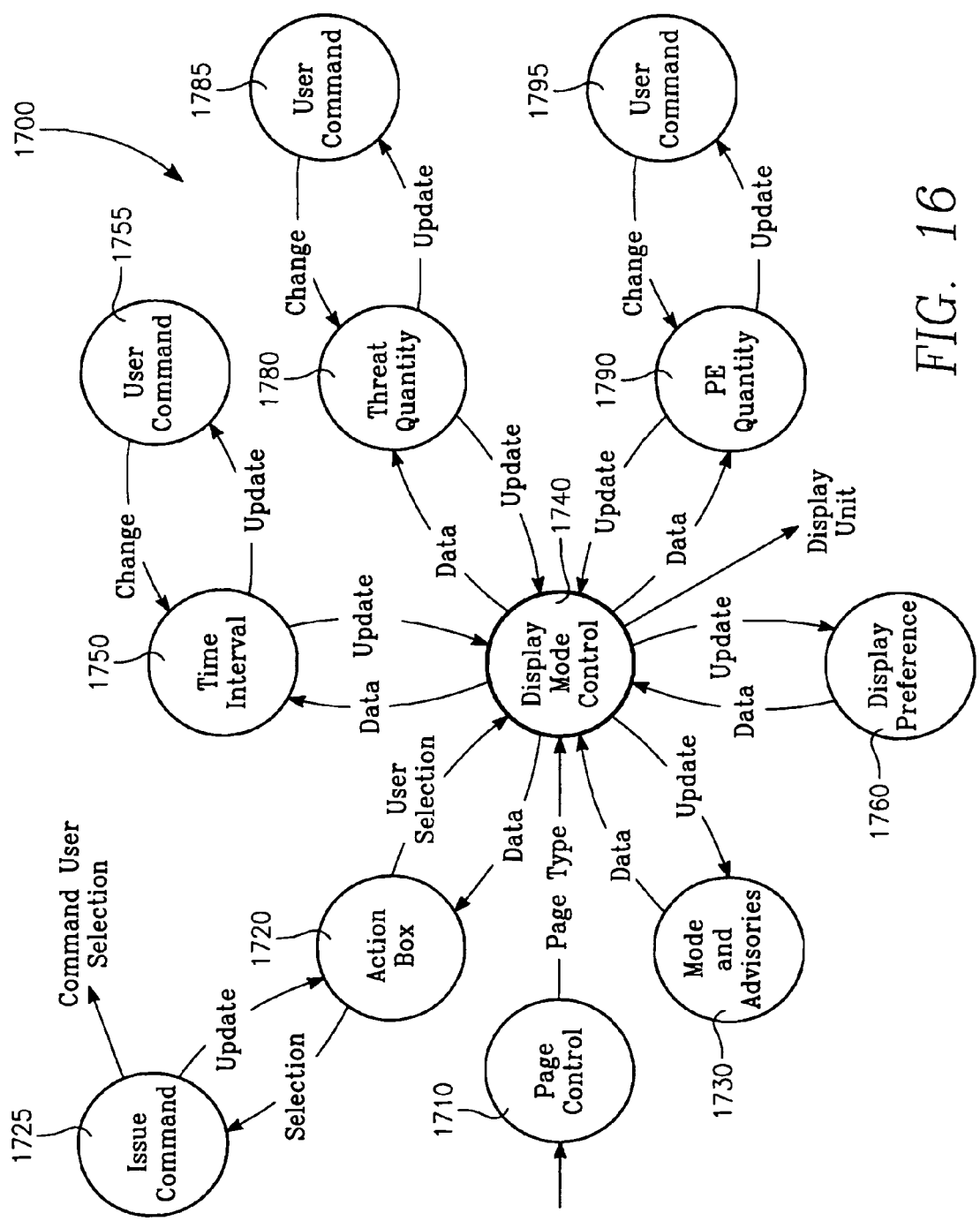
FIG. 16 is a state diagram describing user interaction with the display formats.

At the core of the Display Management routine is the software engine to enable the building of flexible display formats defined by the user. The software providing the flexibility for managing the display formats includes logic to generate push-tile labels, textual advisories, JAR graphics and jamming commands. The logic is best represented by the Display Management state diagram (FIG. 16). The relationship between the Display Management state diagram (FIG. 16) and the software flow chart (FIGS. 15A, 15B and 15C) is that the flow chart path is driven by a variable user input controlled by the events and states shown in the Display Management state diagram. The push-tile driven commands that control transitions through the state diagram create very flexible display formats that are only limited by the available JAR processing data and the performance limits of the chosen display unit hardware and software.

Figure 19:
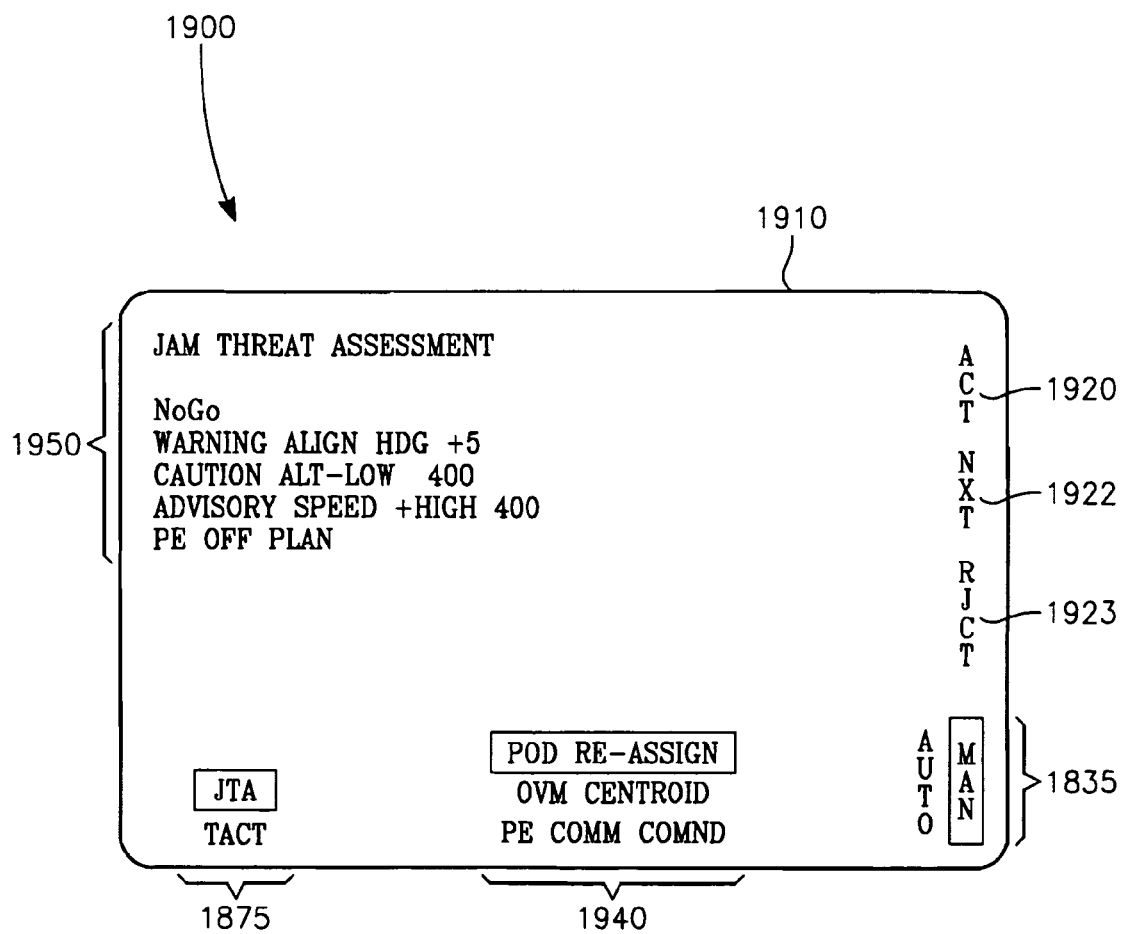
FIG. 19 is a drawing of a representative display format depicting advisories, warnings and a jamming equipment control interface.

In general, entry into the state diagram (FIG. 16) begins with the Page Control event 1710 being active when either the JTA displays are selected by the user (FIG. 15A item 1504) or the ECDSS active check (FIG. 15A item 1502) is positive. A command from Page Control 1710 is sent to Display Mode Control 1740 with the page type information necessary to build a display format. In the preferred embodiment, the initial display format commanded by Page Control 1710 (FIG. 16) is that of FIG. 19 (item 1910) from which subsequent tactical displays may be invoked. In FIG. 19 the JTA label is boxed (item 1875) indicating that depressing the push-tile corresponding with item 1875 has been depressed and will transition to default display of FIG. 18 item 1880.

Referring to FIG. 18, upon transition to the default tactical format 1880 the user is provided with options to transition to any tactical display format defined by the user. Selectable tactical display formats are indicated by labels displayed above or next to a push-tile. As an example, two tactical display formats are selectable, RGAT (FIG. 17 item 1870) or LTLN (FIG. 18 item 1880), by manipulating the push-tile associated with display transitions 1820. The LTLN label is boxed (FIG. 18 item 1820) because it has been selected by the user. When the user depresses the push-tile 1820 corresponding to the tactical display formats the display transitions to the RGAT format (FIG. 17 item 1870) and the RGAT label is boxed. Should the user again depress the push-tile corresponding to the tactical display formats 1820 the display transitions back to the LTLN display format 1880. The number and type of selectable displays are defined by the display application.

An exit control from the TACT mode back to the JTA mode is defined by the display application and any combination of a push-tile and label may be programmed for use on the displays. The exit control must communicate with the Page Control state (FIG. 16 item 1710) to define the page type for processing by the Display Mode Control (FIG. 16 item 1740) state.

Referring to FIG. 19, the JTA display 1910 has a number of fields containing time prioritized information (1835, 1940, 1950) as well as the push-tile labels (1920, 1922 and 1923) that provide a user interface with the Display Management routine. The jam options labels 1835 are associated with a rotary push-tile which allows the user to select Manual (MAN) or fully Automated (AUTO) jam control as the display state (FIG. 16 item 1730). While the MAN state is selected the ECDSS will monitor jam asset management parameters and provide the user with jam control advisories in an Action Box 1940. The Action Box states are under the control of the Action Box state machine (FIG. 16 item 1720).

The portion of the Display Management state diagram (FIG. 16) and the flowchart (FIG. 15A) pertaining to the handling of the Time Critical and Mandatory Acknowledgement items in Table 1, the first of which pertain to MAN and AUTO operation (FIG. 19 item 1835), are now described.

The Action Box state 1720 sends a selection event to the Issue Command state 1725 reflecting any one of a series of user defined jam control recommended actions and corresponding labels. The user is then provided with options to either accept (ACT item 1920) the recommended action, step to the next recommended action (NXT item 1922), or reject the recommended action (RJCT item 1923). The recommended actions are under software control. Three representative recommended actions are presented in FIG. 19 item 1940.

Referring to FIG. 19, the manual mode is active 1835 and the ECDSS has determined that the jamming Pod assigned to the current threat is not able to perform the assigned tasking and has generated a boxed POD RE-ASSIGN recommended action in the Action Box 1940. The ECDSS has also generated several other recommended actions such as a one versus many centroid (OVM CENTROID) as well as a recommended action to issue a PE communications command (PE COMM CMND) to alert the PE that it is off of the flight plan. Since the POD RE-ASSIGN recommended action is selected in the Action Box 1940 if the operator selects the ACT 1920 push-tile, the ECDSS system will activate the jam assignment change required to address the existing jam failure situation. If the operator selects the RJCT 1923 push-tile, the Pod Re-Assign advisory in Action Box 1940 will be removed. If the operator selects the NXT 1922 push-tile the system will step to the next recommended action in the Action Box 1940 list, here it is OVM CENTROID.

The PE alert indicating that the PE is off the flight plan (PE OFF PLAN) is written into an advisory text field 1950. If the user steps to the PE COMM CMND using the NXT push-tile 1922 and elects to reject the PE COMM CMND recommendation using the RJCT push-tile 1923 the PE OFF PLAN advisory will persist in the advisory text field 1950. Any number of alerts may be written into the advisory text field 1950 and tied to any number of recommended actions displayed in the Action Box 1940. The flexibility to display JAR information and interact with the displayed JAR information is the essence of the preferred embodiment of the invention as described in the Display Management state diagram (FIG. 16) and as shown in the representative display format drawings (FIGS. 17, 18 and 19).

Referring to FIG. 15A, a series of checks are performed to determine the state of the jam mode. A first check 1512 is made to determine if a Jam Mode Change is accepted. If the check 1512 returns a positive, indicating that the user has selected ACT (FIG. 19 item 1920), the Set Mode Command 1514 is enabled and any pending change is cleared 1516. If the first check 1512 returns a negative, a Jam Mode Change has not been accepted. A second check 1518 is then made to determine if a Jam Mode Change has been rejected. If the second check 1518 returns a positive, indicating that the user has selected RJCT (FIG. 19 item 1920) any pending change is cleared 1516 leading to a third check 1520. If the second check 1518 returns a negative, a Jam Mode Change has not been rejected leading to the third check 1520. The third check 1520 determines whether a Jam Mode Change needs to be activated as a result of the user selecting ACT (FIG. 19 item 1920). If the result of the third check 1520 is positive an advisory is posted 1522 and the Action Box state (FIG. 16 item 1720) sends an event to the Issue Command state (FIG. 16 item 1725) to issue an appropriate command to the ECDSS.

Referring to FIG. 15A, a series of checks are now performed to determine whether a PE communications command (PE COMM CMND, FIG. 19 item 1940) has been issued by the EA and sent to the PE. The PE communications command is the second Mandatory Acknowledgement task required per Table 1. A first check 1524 is made to determine if a PE communications command is accepted. If the check 1524 returns a positive, indicating that the user has selected ACT (FIG. 19 item 1920), the Set PE Command 1526 is enabled and any pending PE communication advisory is cleared 1530. If the first check 1524 returns a negative, a PE communications command has not been accepted. A second check 1528 is then made to determine if a PE communications command has been rejected. If the second check 1528 returns a positive, indicating that the user has selected RJCT (FIG. 19 item 1920) any pending PE communication advisory is cleared 1530 leading to a third check 1532. If the second check 1528 returns a negative, a PE communications command has not been rejected leading to the third check 1532. The third check 1532 determines whether a PE communications command needs to be activated as a result of the user selecting ACT (FIG. 19 item 1920). If the result of the third check 1532 is positive an advisory is posted 1534 and the Action Box state (FIG. 16 item 1720) sends a User Selection event to the Issue Command state (FIG. 16 item 1725) to issue an appropriate command to the ECDSS suite. Program execution continues with item 1535 providing a transition between FIG. 15A and FIG. 15B.

Referring to FIG. 15B, a series of checks are now performed to determine whether an OVM centroid (OVM CENTROID, FIG. 19 item 1940) display reference option has been selected by the user. The OVM centroid display reference option is the third Mandatory Acknowledgement task required per Table 1. A first check 1636 is made to determine if an OVM centroid display reference option is accepted. If the check 1636 returns a positive, indicating that the user has selected ACT (FIG. 19 item 1920), the Set OVM centroid display reference command 1642 is enabled and any pending OVM centroid display reference advisory is cleared 1646. If the first check 1636 returns a negative, an OVM centroid display reference command has not been accepted. A second check 1640 is then made to determine if an OVM centroid display reference command has been rejected. If the second check 1640 returns a positive, indicating that the user has selected RJCT (FIG. 19 item 1920) any OVM centroid display reference advisory is cleared 1642 leading to a third check 1644. If the second check 1640 returns a negative, an OVM centroid display reference command has not been rejected leading to the third check 1644. The third check 1644 determines whether an OVM centroid display reference command needs to be activated as a result of the user selecting ACT (FIG. 19 item 1920). If the result of the third check 1644 is positive an advisory is posted 1646 and the Action Box state (FIG. 16 item 1760) sends a user Selection event to the Display Control state (FIG. 16 item 1740).

Software execution continues with the processing of those tasks in the Mandatory Timed and Optional categories of Table 1. Referring to FIG. 15B, the Update Advisory Text step 1648 is performed and updates the advisories posted in the advisory text field (FIG. 19 item 1950). The advisories are user defined derived from the information supplied by JAR processing, EOB, ECDSS operational status, PE status and navigational aids.

As previously described, the preferred embodiment of the Display Management routine includes two types of display formats, JTA (FIG. 19) and TACT (FIG. 17 and FIG. 18). The JTA display is discussed above. The TACT display format contains graphical display elements such as a JAR (FIGS. 1, 2, 3 and 11), a JAS (FIGS. 7, 8, 9, 10, 12), PE position, EA position and planned flight paths. FIG. 17 item 1870 and FIG. 18 item 1880 are representative of the types of graphical displays a software programmer skilled in the art of aircraft display graphics may implement. The TACT display formats are essential as an aircrew decision aid, which is object of this invention. Graphical representation of the threat emitter's effectiveness in the presence of active EA jamming allows the EA aircrew to rapidly assess the vulnerability of any assigned PE.

Referring to FIG. 15B, after the advisory textual elements are updated 1648 a series of checks are made to properly maintain the TACT display graphics. First a check 1650 is made to determine whether or not the TACT graphical displays are active. If the response is positive and the TACT graphics are active the TACT graphics are updated 1652. If the response to the check 1650 is negative the graphics are cleared from memory 1654 and Display Management execution continues. The display units posting the JTA displays are used by other platform systems for display purposes that may be of more interest to the user. Consequently, there may not be a display unit available for posting the JTA displays. Item 1635 provides a transition between FIG. 15B and FIG. 15C as program execution continues.

In general, it is well known by those skilled in the art of programming aircraft displays that user preferences encompassing display type, display reference point and the structure of the displayed elements vary and are best implemented in software. Examples of common display types are range versus bearing, azimuth versus elevation and cognizant perspective. Examples of common reference points are aircraft stabilized and earth stabilized. Examples of structure for the displayed elements are an OVM display, viewing all of the JAR data at once, viewing all of the JAS data at once, displaying selected portions of the JAR or JAS data as well as viewing PE and EA information. The Display Management routine includes a Display Preference state 1760 containing the software code to generate combinations of display types, display references and display element structures.

Referring to FIG. 15C, after the maintenance of the TACT graphics is completed a series of checks are made to determine the user preferences for the viewing the displayed graphics and text. A first check 1662 is made to determine if the user preference for the display type is direction of arrival (DOA). If DOA check 1662 is positive then a DOA Update 1664 event is sent to the Display Reference state 1760. If the DOA check 1662 is negative the DOA is cleared 1666 by the Display Reference state 1760. A second check 1668 for OVM active is made to determine if the user preference for the display type is OVM. If OVM check 1668 is positive then an OVM Update 1670 event is sent to the Display Reference state 1760. If the OVM check 1668 is negative the OVM is cleared 1672 by the Display Reference state 1760.

The DOA and OVM check and response logic blocks in FIG. 15C are representative of the type of logic blocks that may be duplicated for any number or combination of user display preferences. The present invention provides the flexibility to customize the aircrew decision aid displays and the above examples are not meant to limit the scope of the invention to the displays disclosed. Any limitation encountered is related to the processing capability and size of the digital memory of the computer selected by the user.

Referring to FIG. 15C, after the display of the highest priority display information in Table 1 is completed a series of checks are made to determine whether any of the optional text requires updating. The optional text consists of those display elements that may be dropped from a JTA or TACT display should the display processor functionality degrade as it reaches it's processing throughput limits. Optional text is of two types, Structure Text and Detailed Text. Examples of Structural Text are the axis for the RGAT display (FIG. 17 items 1812 and 1814), the axis 1812 labels in feet (FT), the axis 1814 labels and numbers in nautical miles (NM). An example of Detailed Text is the JTA page identification text, JAM THREAT ASSESSMENT (FIG. 19 item 1950). A first check 1674 is made to determine if the optional text requires updating. If the Detailed Text Active check 1674 is positive then an Update Text 1676 event is sent to the Display Preference state 1760. If the Detailed Text Active check 1674 is negative then an Update Structure Text 1678 event is sent to the Display Preference state 1760. Execution ends with step 1682.

In the preferred embodiment, a user is provided a number of opportunities to configure the displays to best represent the available information through the use of a rotary. Referring to FIG. 17, item 1805 is a cluster of labels associated with push-tiles for controlling the time reference for the display format. One label corresponds to incrementing the time (FWD) and another label corresponds to decrementing the time (BCK). The boxed numerical value (3) corresponds to the number of minutes into the future the displayed information is extrapolated. In this example, the aircrew may change the extrapolation time either forward to four minutes or back to two minutes as desired. In the preferred embodiment the maximum extrapolation time is under control of the software programmer and is set to five minutes. A specific algorithm to generate a look-ahead projection and advisories (FIG. 21) based upon the extrapolation time selected by the user via the push-tiles for controlling the time reference display format (FIG. 17 item 1805) is described in detail below.

Referring to FIG. 16, a user selection of a FWD or BCK push-tile will send a Change event from the User Command state 1755 to the Time Interval state 1750 which in turn sends an Update event to the Display Control state 1740 for display processing. The Display Control state 1740 then sends a Data event to the Time Interval state 1750 which sends an Update event to the User Command state 1755 providing feedback that the command and response to the command is complete and ready for display on the display units.

In yet another preferred embodiment, a user is provided another opportunity to configure the displays to best represent the available information through the use of a rotary. Referring to FIG. 17, item 1810 is a cluster of labels associated with push-tiles for controlling the threat graphics displayed. In this example, the JAR graphic displayed has an index of one as represented by the boxed numeral one. A JAR graphic is composed of the JAR coverage areas (FIG. 17 item 215, 230, and 250) and the relative PE and EA positions as shown in FIG. 17. Each JAR graphic is assigned an index in a display list for record keeping and assuring consistency across the display formats as the display configuration commands are processed. By depressing the NXT push-tile 1810 the boxed numeric increments from a one to a two corresponding to the second threat in the threat display list. At this point, the JAR graphic for the first threat is removed from the display allowing the user to only view the second threat JAR graphic, not shown. A subsequent depression of the NXT push-tile 1810 increments to the third threat in the threat display list and leads to the removal of the second threat JAR graphic. Repeated depressions of the push-tile associated with the PREV 1810 label decrements the numeric to its minimum value providing the opportunity for the user to rotate through the threat display list in the opposite direction. The JAR graphics in the threat display list may be individually viewed in this manner until the rotary steps to an all (ALL) position or a multiple (M) position.

The ALL position allows the user to view all of the threats in the threat display list simultaneously. This may result in a cluttered display with many overlapping display elements in the event that there are numerous threats with closely space JAR graphic symbols. To alleviate this problem the user is provided with a multiple (M) option in the rotary. The M option allows the user to cursor designate, or 'hook', any individual threat JAR graphic and remove that JAR graphic symbol set from the display. This allows the user to view the desired number of threats in the threat display list.

The ability of the user to control the number of displayed threats is a feature that is necessary to de-clutter the display format allowing the user to focus on any particular threat should be desire.

User selection of a NXT or PREV push-tile will send a Change event from the User Command state 1785 to the Threat Quantity state 1780 which in turn sends an event to the Display Control state 1740 for display processing. The Display Control state 1740 then sends a Data event to the Threat Quantity state 1780 which sends an Update event to the User Command state 1785 providing feedback that the command and response to the command is complete and ready for display on the display units.

In still yet another preferred embodiment, a user is provided another opportunity to configure the displays to best represent the available information through the use of a rotary. Referring to FIG. 17, item 1815 is a cluster of labels associated with push-tiles for controlling the display of threats associated with a particular PE. This feature is useful in the event that a user is interested in viewing all of the threats that are capable of detecting a particular PE. By depressing the NXT push-tile the boxed numeric increments from a one to a two if there is a second PE available in the display list. All of the threats that can detect the second PE will be displayed and the threats associated with the first PE are removed from the display. Repeated depressions of the NXT push-tile will increment the numeric to it's maximum value then to an ALL choice. The ALL will return all of the PEs and the associated threats to the display list allowing the user to once again view all of PEs and threats. Repeated depressions of the PREV push-tile decrements the numeric to it's minimum value providing the opportunity for the user to rotate through the PE list in the opposite direction. Rotation to the ALL position from the minimum direction returns all of the PEs and threats to the display.

User selection of a NXT or PREV push-tile will send a Change event from the User Command state 1795 to the PE Quantity state 1790 which in turn sends an event to the Display Control state 1740 for display processing. The Display Control state 1740 then sends a Data event to the PE Quantity state 1790 which sends an Update event to the User Command state 1795 providing feedback that the command and response to the command is complete and ready for display on the display units.

The Time 1805, THRT 1810 and PE 1815 groups of labels are common across multiple display formats as shown in FIG. 18. In the preferred embodiment, it is necessary to provide consistency in display operation to the extent possible. Referring to FIG. 17 and to FIG. 18, the push-tile legends are placed in the same position and retain the same functionality as the display formats are transitioned. The consistency in display operation also provides the additional benefit of minimizing the software programming and minimizing execution time for program operation regarding the management of displays.

In order to more effectively provide information to the user the preferred embodiment incorporates a color scheme for displaying text and graphics. The Display Management routine needs to assure that unambiguous caution and advisory cues are provided to the user and that high priority caution and advisory cues are readily identifiable. In the preferred embodiment, all text and graphic displays will utilize a defined set of standard colors to convey information as listed in Table 3.

TABLE 3

Display Colors

| Color | Meaning | Use |
|---|---|---|
| White | Informative structure | Body Text, Title, Heading, etc. |
| Green | No action required | Dynamic graphic/text |
| Cyan (Blue) | Advisory, Action Eminent | Dynamic graphic/text |
| Yellow | Caution, Action Impending | Dynamic graphic/text |
| Red | Warning, Action Required | Dynamic graphic/text |
| Pink (Flesh) | Informative, Possible Action | Dynamic graphic/text |
| Black | None | Background |

The capability of the applicant's invention to rapidly provide situational awareness to the aircrew by taking advantage of JAR processing information and in turn displaying the results of JAR processing in a highly flexible format controlled by the aircrew is best illustrated by example.

The example is, the user is presented with five overlapping JAR graphics associated with three PEs drawn on a single RGAT (FIG. 18) display format. The resulting display is cluttered with text and graphics impeding a quick assessment of the effectiveness of the EA. The EA is assigned PE1 as a primary assignment and wishes to view only those threats for PE1. The user depresses the NXT push-tile to rotate the PE display numeric from ALL to 1. The display now depicts three threats associated with PE1 while simultaneously suppressing the text and graphics for PE2 and PE3. The user then determines that emitter threat two is not relevant due to the color of the threat graphics and elects to de-clutter the display by removing all traces of threat emitter two graphics and text. The user then depresses the NXT push-tile until the M is present then designates threat two for deletion from the display list. The user now is provided the information to assess the current effectiveness of the EA in a clear and de-cluttered format. The user then desires a view of the scenario two minutes into the future and depresses the Time FWD push-tile until the numeric is 2. The display is updated with the appropriate look-ahead projections and the user then assesses the future effectiveness of the EA. The user is able to rapidly assess the effectiveness of the EA in protecting the PE and obtaining a situational awareness quickly and with little effort.

Figure 20:
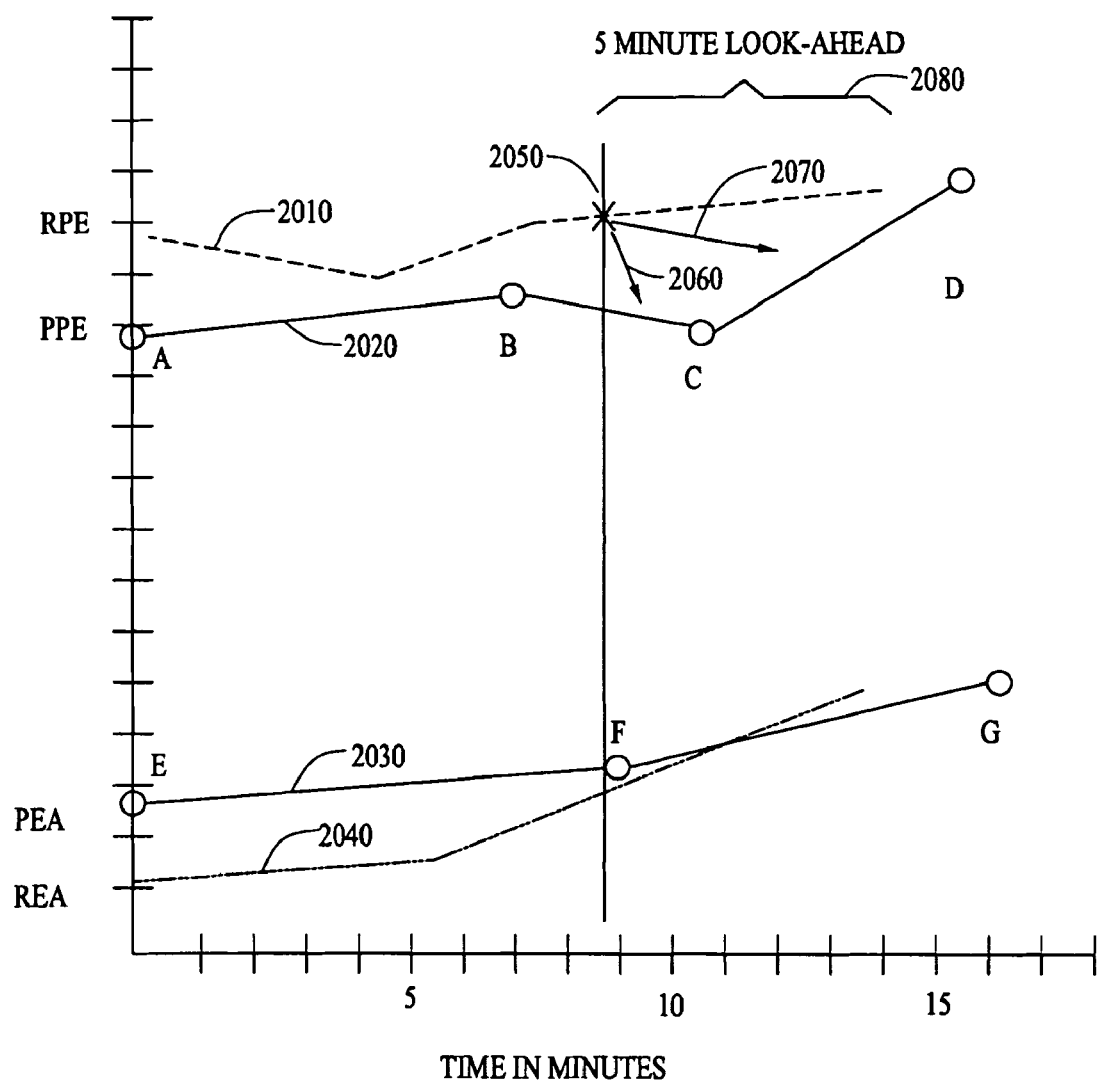
FIG. 20 is a graphic depicting the planned path (P), the reported (R) flight path for both the PE and the EA.
Figure 21:
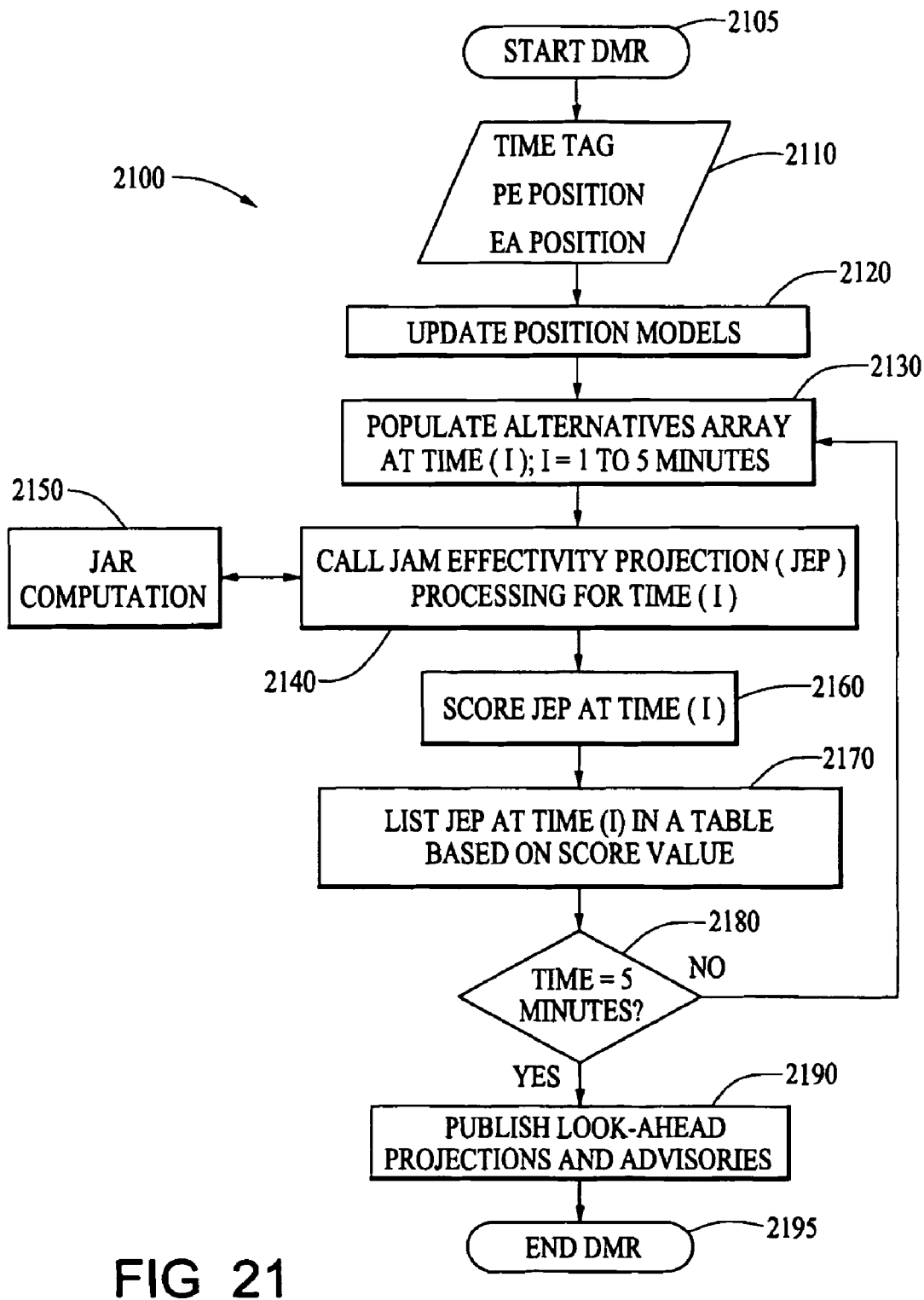
FIG. 21 is the highest level flow chart of the Dynamic Mission Re-planning (DMR) software. The results of the DMR algorithm are the projected "look-ahead" flight paths that are a key feature of the preferred embodiment.

The feature to display look-ahead projections as described in the immediately preceding example will now be described in detail. Referring to FIG. 20, several plots are depicted representing illustrative examples of planned and actual aircraft flight paths. The Planned Protected Entity (PPE) route is represented by a line 2020 denoted by points ABCD. The PPE route 2020 is defined during the mission planning phase. The Reported Protected Entity (RPE) route is represented by a dashed line 2010 generated from information the PE provides to the EA via a data link or other means of electronic communication. The look-ahead projection portion of the RPE route begins at the X point 2050 and is extrapolated five minutes into the future as represented by the portion of the dashed line 2010 within the five minute look-ahead window 2080. The five minute look-ahead projection is based upon the PE's reported course, speed, altitude and any reported changes in velocity which are then linearly extrapolated into the future by a Dynamic Mission Re-planning (DMR) software based algorithm (FIG. 21 item 2100).

The Planned Electronic Attack (PEA) route 2030 is denoted by points EFG. The PEA route 2030 is also defined during the mission planning phase. The Reported Electronic Attack (REA) route is represented by dashed line 2040 which is derived from information provided by the navigational equipment onboard the EA. As shown, the look-ahead projection portion of the REA route begins at the nine minute time mark associated with the X point 2050 and is extrapolated for five minutes into the future and is represented by the portion of the dashed line 2010 contained within the look-ahead window 2080. The look-ahead projection is based upon the EA's reported course, speed, altitude and any reported changes in velocity which are then linearly extrapolated into the future by the DMR software algorithm (FIG. 21 item 2100).

With further reference to FIG. 20, an examination of RPE route 2010 reveals that the PE has veered off of the PPE route 2020 and will remain off the PPE route 2020 unless a correction to the PE flight path is made. It can also be observed that REA route 2040 will intersect the PEA route 2030 at just beyond point F, at the approximately the ten minute mark but that unless some action is taken the EA will again deviate from the planned path. Ideally, the reported and planned routes for the aircraft would coincide for the entire flight. The reasons for the reported and planned route deviations are situation dependent. It is an objective of the present invention, subject to hardware capabilities and electrical power limitations, to ensure that the EA will provide adequate jamming protection for the PE despite any flight path deviations.

An output of the DMR algorithm is a series of recommended course, speed and altitude changes that are available for application to the flight parameters of the EA and the PE to ensure that the EA provides adequate jamming coverage for the PE. As an example, the DMR algorithm will generate a vector for a rapid course correction 2060, a vector for a moderate course correction 2070 or a maintain course recommendation since the RPE route 2010 will intersect the PPE route 2020 at approximately time 16. The preferred embodiment is invoked in the event that the PE is unable to alter its current flight path. In that event, a corresponding series of recommended changes for the EA flight path are then calculated by the DMR algorithm and presented to the aircrew. The EA aircrew will then evaluate all of the recommendations for flight path changes and act upon them by altering course, speed or altitude of the EA.

This specification now turns to a high level description of the operation for the DMR software based algorithm as shown in FIG. 21 item 2100. This high level description serves as an overview of a DMR processing cycle (item 2100) prior to a detailed discussion of the DMR processing cycle (FIGS. 22 through 26). Step 2105 starts the DMR algorithm when called. A data set (step 2110) is called to seed the DMR processing cycle (item 2100). The data set (step 2110) includes a system time tag, the current PE position and the current EA position. The data set (step 2110) is used to update a position model for the EA and to update a position model for the PE as shown in step 2120. The position models serve as the initial point for the linear extrapolation of the RPE (FIG. 1 look-ahead window 2080) position and for the linear extrapolation of the REA (FIG. 1 look-ahead window 2080) position. The position models contain the most up to date information related to the present positions of the EA and the PE. Once the position models have been updated in step 2120 the DMR algorithm calculates a series of time based alternative positions by systematically varying the parameters for the course, speed and altitude initial values, jointly and severally, in one minute intervals as shown in step 2130.

In one embodiment, an Alternatives Array is populated with data structures representing the alternative positions for the EA as generated for each one minute interval out to a maximum of five intervals, equating to five minutes (step 2130). The contents of each Alternatives Array must be evaluated for jamming effectiveness by invoking a Jam Effectivity Projection (JEP) process as shown in step 2140. The JEP evaluation (step 2140) invokes a JAR computation (step 2150). The JAR computation (step 2150) executes JATO equation 1-1 as described earlier in this specification. The results of the JAR computation returns an assessment as to whether or not the EA aircraft position corresponding to the alternative position is viable for providing effective jamming protection for the PE. For each alternative position the JEP scores and then ranks the PE alternative position (step 2160) using the both the degree of EA maneuvers and jamming effectiveness and then lists the results in a table (step 2170). This process is repeated (step 2180) until the maximum time interval is encountered. Once the maximum time interval has been encountered the recommended course changes associated with the recommended alternative positions are published along with any advisories (step 2190). Once publishing (step 2190) is complete the DMR algorithm for this particular cycle is ended (step 2195).

The published alternative positions and advisories are available to the EA aircrew and provide a look-ahead path to increase situational awareness which will also in turn decrease aircrew workload by obviating the need to manually perform repetitive position and course extrapolations. The accuracy of the published alternative positions and advisories enhance aircrew situational awareness, improves aircrew efficiency and leads to an increased probability of mission success by providing the best assessment of position and course for a given threat emitter.

Figure 22:
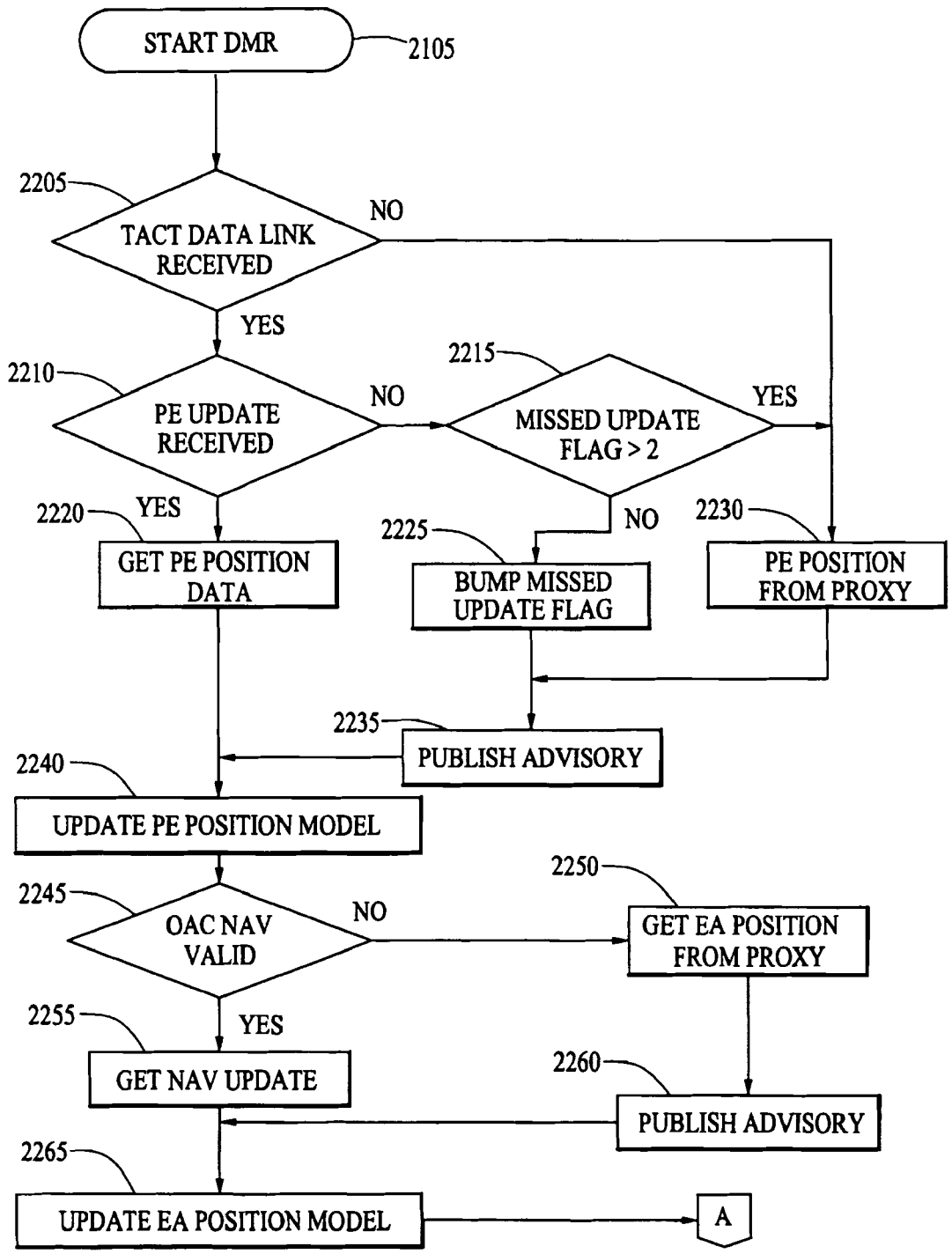
FIG. 22 is a lower level flow chart describing the software operations for the portion of the DMR software that reads in the aircraft positional information and updates the PE and EA position models that are maintained in computer memory.

This specification now turns to a detailed description of the specific operation of the DMR algorithm (FIG. 21 item 2100) beginning with FIG. 22. As an overview, FIG. 22 depicts that portion of the DMR algorithm (FIG. 21 item 2100) that retrieves and processes the EA and PE positional data and then uses the processed EA and PE positional data to update the position models for the EA and for the PE.

A check for the receipt of a Tactical Data Link message (step 2205) is made to determine whether or not the EA has received from the PE the Tactical Data Link message. If the EA has received the Tactical Data Link message then a check is made (step 2210) to determine if a positional update message for the PE is contained within the Tactical Data Link message. If the Tactical Data Link message contains the PE positional data then the DMR algorithm extracts the PE positional data (step 2220) from the Tactical Data Link message and uses the PE positional data to update the PE positional model (step 2240).

If the EA has not received the Tactical Data Link message (step 2205) a PE proxy provides the PE positional information in step 2230. The PE proxy is an estimated position for the PE based upon historical positional data for the PE. The PE proxy is necessary to seed the DMR algorithm with the best available estimate of the position for the PE. The DMR algorithm will publish an advisory (step 2235) alerting the EA aircrew to the fact that the position model for the PE is using PE proxy data.

In the event that the Tactical Data Link message has been received (step 2205) from the PE but the Tactical Data Link message does not contain a PE update (step 2210) a missed update flag counter is evaluated to determine if the value of the missed update flag counter is greater than two (step 2215). If the value of the missed update flag counter (step 2215) is greater than two then an advisory is published (step 2235) alerting the aircrew to the fact that the PE proxy (step 2230) is providing the PE position model data.

If the value of the missed update flag counter is less than two (step 2215) the missed update flag counter is incremented (step 2225) by one. An advisory is then published (step 2235) alerting the aircrew that there has been no update to the PE position and that the PE position model has been updated (step 2240) with stale position data. The missed update flag counter is reset to zero upon receipt of a valid PE update (step 2210).

An own aircraft (OAC) navigational (Nav) validity check (step 2245) is made to ascertain the validity of the position data provided to the DMR algorithm by the EA's navigational suite. If the OAC Nav check (step 2245) returns a not valid result an EA proxy provides the EA position (step 2250). The EA proxy functions as does the PE proxy described above. An advisory is published (step 2260) to alert the aircrew to the fact that the information used to update the EA positional model (step 2265) is based on the information provided by the EA proxy (step 2250).

If the result of the OAC Nav check (step 2245) is positive, indicating that the EA navigational system is providing useful data, the DMR algorithm uses the EA navigational data (step 2255) to update the EA positional model (step 2265).

Figure 23:
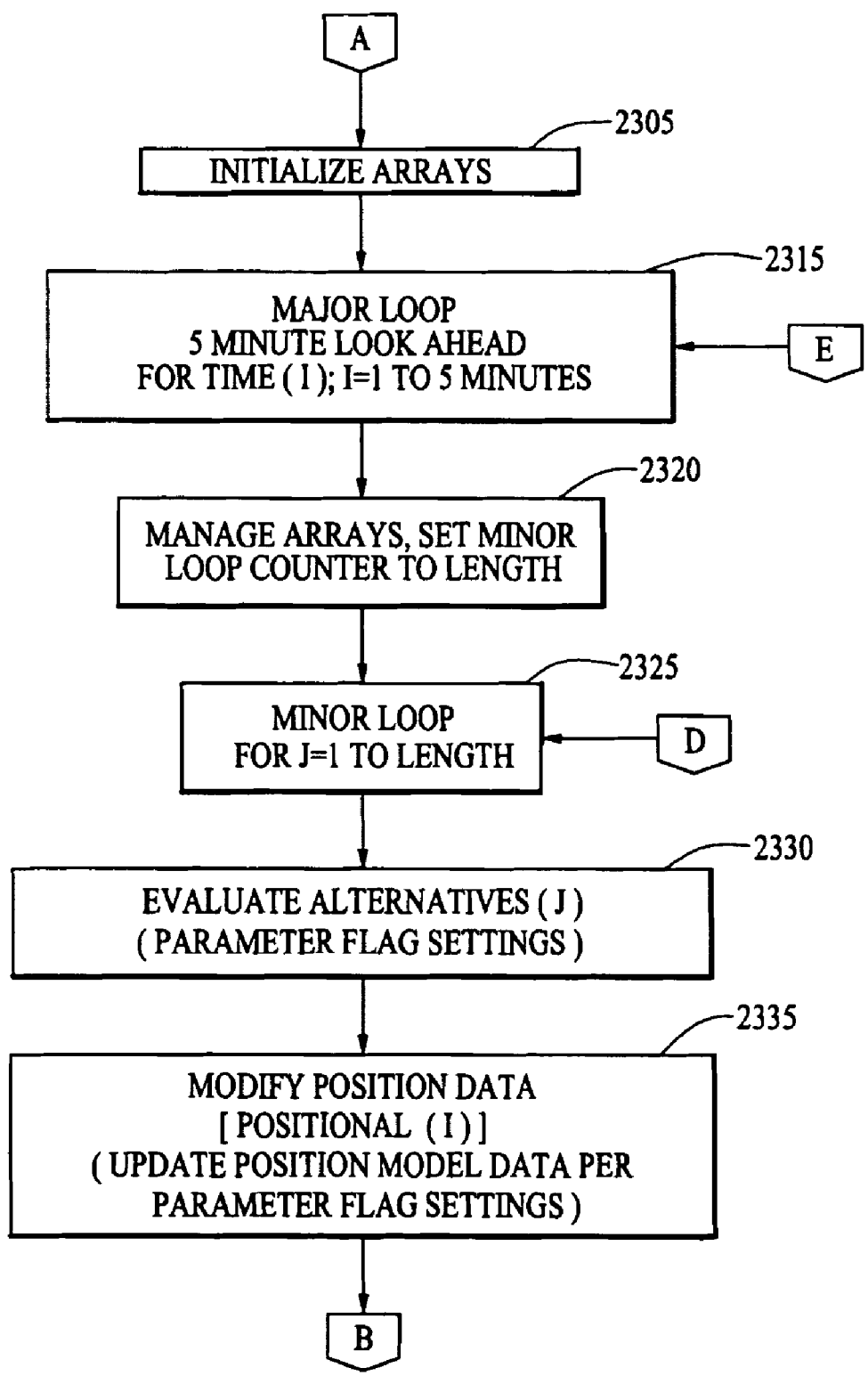
FIG. 23 is a lower level flow chart describing the software operations for the portion of the DMR software that initializes, populates and maintains an array of alternative path positions that define the "look-ahead" flight paths.

Referring to FIG. 23, an initialization of arrays is performed to clear the arrays of any residual data (step 2305). The arrays contain a plurality of data structures that represent a plurality of data described below. Next, a count-controlled loop is constructed (step 2315) using a counter initialized to one. The count-controlled loop is synchronized to the look-ahead projection time which is measured in minutes. The preferred embodiment has a count-controlled loop for time beginning at one minute and extends to a maximum of five minutes (step 2315). The count-controlled loop for time (step 2315) serves as a major DMR algorithm processing loop and has nested within it a minor loop which executes the core portion of the DMR algorithm that determines the optimum look-ahead positions. Prior to executing the core processing in the minor loop it is necessary to populate the arrays with data retrieved from computer memory and to initialize a variable that will serve as a minor loop counter limit (step 2320). In the preferred embodiment the starting value of the minor loop counter (step 2325) is initialized to one and the ending value of the minor loop is initialized to a maximum number of twenty-seven iterations. Twenty-seven iterations corresponds to a maximum number of passes that are evaluated for jamming effectiveness, as described below.

A first array to be populated (step 2320) is an Alternatives Array containing a table of parameter flags, reference Table 4. A second array to be populated (step 2320) is a Positional Variables Array containing extrapolated data for heading, altitude and speed as extracted for the EA positional model (FIG. 22 item 2265). The data in the second array also reflects the application of the parameter flags of Table 4.

The minor loop counter (step 2325) controls the array indexing and data flow used to evaluate the parameter flag settings (step 2330) as stored in the Alternatives Array. The parameter flag in a particular cell of the Alternatives Array is associated with the data in a corresponding cell in the Positional Variables Array. The state of the parameter flag determines whether the data residing in the cell of the Positional Variables Array is to be modified (step 2335). The heading, altitude and speed data in the Positional Variables Array serves as an initial basis for systematically varying the heading, altitude and speed data in the Positional Variables Array per the parameter flag settings in the Alternatives Array.

An example of the interaction between the Alternatives Array and the Positional Variables Array follows. When the Alternative Array cell has a value of zero for the parameter flag the positional model data resident in the associated cell in the Positional Variables Array will not be systematically varied. When the Alternative Array cell has a value of one for the parameter flag the positional model data resident in the associated cell in the Positional Variables Array will be systematically varied. Indexing control for both the Alternatives Array and the Positional Variables Array is provided by the minor loop counter (step 2325).

An example of systematically varying the Positional Variables Array data according to the parameter flag setting (step 2335) in the Alternatives Array follows.

Referring to Table 4, each row corresponds to a set of parameter flags that are used control the modification of the associated heading, speed or altitude data extracted from the EA positional model. A value of one in a particular parameter flag cell indicates that a corresponding cell containing the positional variable is changed as indicated by the data type and signage, reference the column headers in Table 4. Using the row data in Pass 8, a one in the column "HGD+" indicates that the current heading provided by the position model for the EA should be incremented in a positive direction by an amount. The amount of heading change limit is fixed during preflight preparations and has limits constrained by the aerodynamic capabilities of the aircraft. Heading changes for one embodiment of the invention are incremented in five degree increments where the cumulative five degree increments reach a limit set by the user. In the preferred embodiment a positive heading change is clockwise and a negative heading change is counter clockwise. A one is contained in the "Alt+" column indicating an increase in the altitude by an amount. The amount of altitude change is a limit fixed during preflight preparations and has limits constrained by the aerodynamic capabilities of the aircraft. Altitude changes for one embodiment of the invention are incremented in one thousand feet increments where the cumulative one thousand feet increments reach a limit set by the user. A one is contained in the "Spd−" column indicating a decrease in speed by an amount. The amount of speed change is a limit fixed during preflight preparations and has limits constrained by the aerodynamic capabilities of the aircraft. Speed changes for one embodiment of the invention are incremented in one hundred knot increments where the cumulative one hundred knot increments reach a limit set by the user.

TABLE 4

Parameter Flags

| Pass # | Hdg+ | Hdg− | Alt+ | Alt− | Spd+ | Spd− | Change |
|---|---|---|---|---|---|---|---|
| 1 | 0 | 0 | 0 | 0 | 0 | 0 | None |
| 2 | 1 | 0 | 0 | 0 | 0 | 0 | Hdg+ |
| 3 | 0 | 1 | 0 | 0 | 0 | 0 | Hdg− |
| 4 | 0 | 0 | 1 | 0 | 0 | 0 | Alt+ |
| 5 | 0 | 0 | 0 | 1 | 0 | 0 | Alt− |
| 6 | 0 | 0 | 0 | 0 | 1 | 0 | Spd+ |
| 7 | 0 | 0 | 0 | 0 | 0 | 1 | Spd− |
| 8 | 1 | 0 | 1 | 0 | 0 | 0 | Hdg+, Alt+ |
| 9 | 1 | 0 | 0 | 1 | 0 | 0 | Hdg+, Alt− |
| 10 | 1 | 0 | 0 | 0 | 1 | 0 | Hdg+, Spd+ |
| 11 | 1 | 0 | 0 | 0 | 0 | 1 | Hdg+, Spd− |
| 12 | 0 | 1 | 1 | 0 | 0 | 0 | Hdg−, Alt+ |
| 13 | 0 | 1 | 0 | 1 | 0 | 0 | Hdg−, Alt− |
| 14 | 0 | 1 | 0 | 0 | 1 | 0 | Hdg−, Spd+ |
| 15 | 0 | 1 | 0 | 0 | 0 | 1 | Hdg−, Spd− |
| 16 | 0 | 0 | 1 | 0 | 1 | 0 | Alt+, Spd+ |
| 17 | 0 | 0 | 1 | 0 | 0 | 1 | Alt+, Spd− |
| 18 | 0 | 0 | 0 | 1 | 1 | 0 | Alt−, Spd+ |
| 19 | 0 | 0 | 0 | 1 | 0 | 1 | Alt−, Spd− |
| 20 | 1 | 0 | 1 | 0 | 1 | 0 | Hdg+, Alt+, Spd+ |
| 21 | 1 | 0 | 1 | 0 | 0 | 1 | Hdg+, Alt+, Spd− |
| 22 | 1 | 0 | 0 | 1 | 1 | 0 | Hdg+, Alt−, Spd+ |
| 23 | 1 | 0 | 0 | 1 | 0 | 1 | Hdg+, Alt−, Spd− |
| 24 | 0 | 1 | 1 | 0 | 1 | 0 | Hdg−, Alt+, Spd+ |
| 25 | 0 | 1 | 1 | 0 | 0 | 1 | Hdg−, Alt+, Spd− |
| 26 | 0 | 1 | 0 | 1 | 1 | 0 | Hdg−, Alt−, Spd+ |
| 27 | 0 | 1 | 0 | 1 | 0 | 1 | Hdg−, Alt−, Spd− |

Systematically varying the extrapolated positional data of the EA produces an alternative position for the EA. The EA alternative positions vary as the individual parameters of heading, speed and altitude are systematically varied, reference the last column of Table 4. Each of the EA alternative positions will be evaluated and ranked according to its suitability for providing protective jamming coverage for the PE. The alternative position derivation and associated ranking is an objective of the preferred embodiment.

Figure 24:
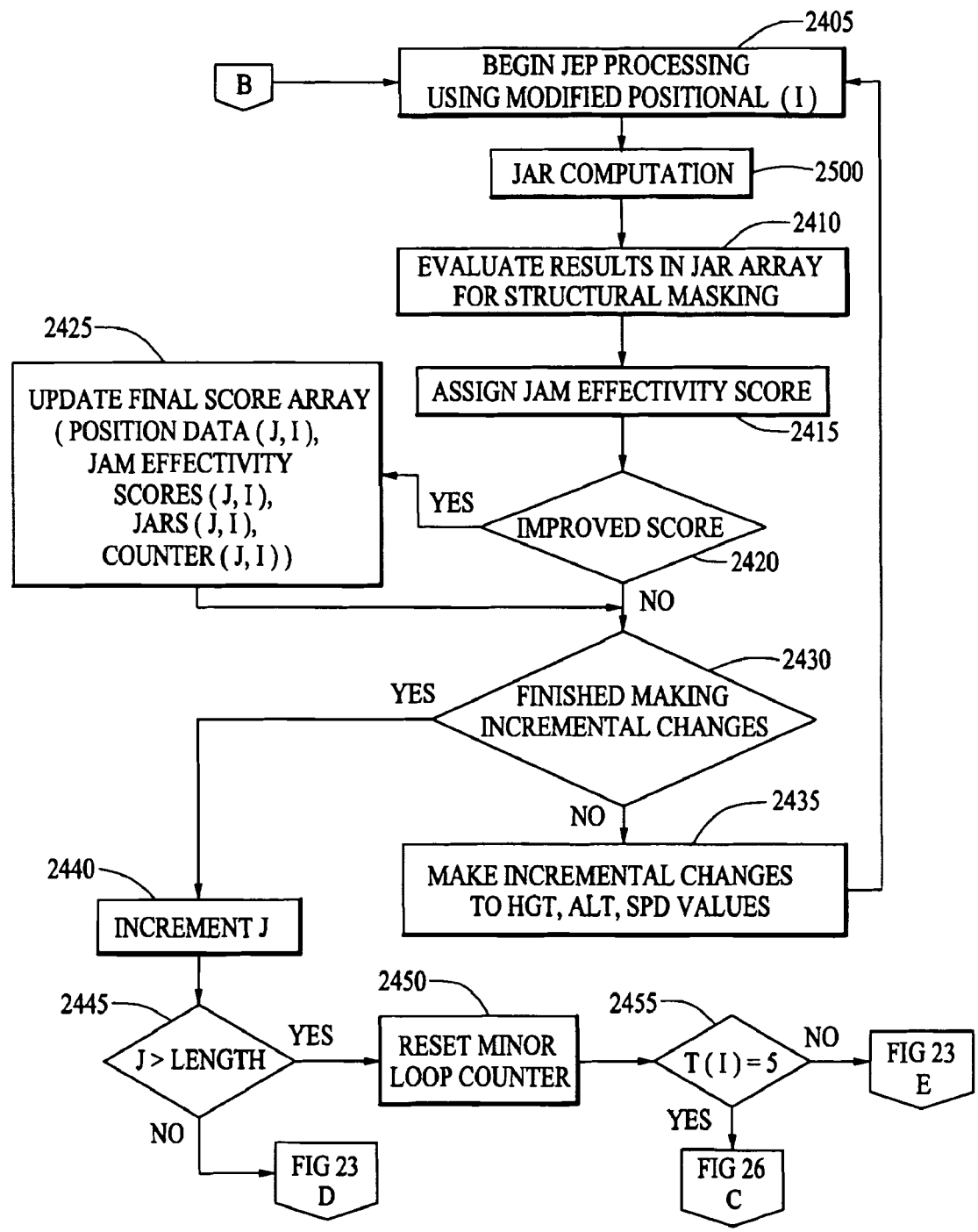
FIG. 24 is a lower level flow chart describing the software operations for the portion of the DMR algorithm that performs the evaluation and scoring of the jamming effectivity projections.

Referring to FIG. 24, a Jamming Effectivity Projection (JEP) process is invoked (step 2405) to evaluate and rank the jamming effectiveness of each alternative position. The JEP process accepts the modified positional data (FIG. 23 step 2335) from the Positional Variable Array and hands the modified positional data to a JAR computation (FIG. 25 step 2500).

Figure 25:
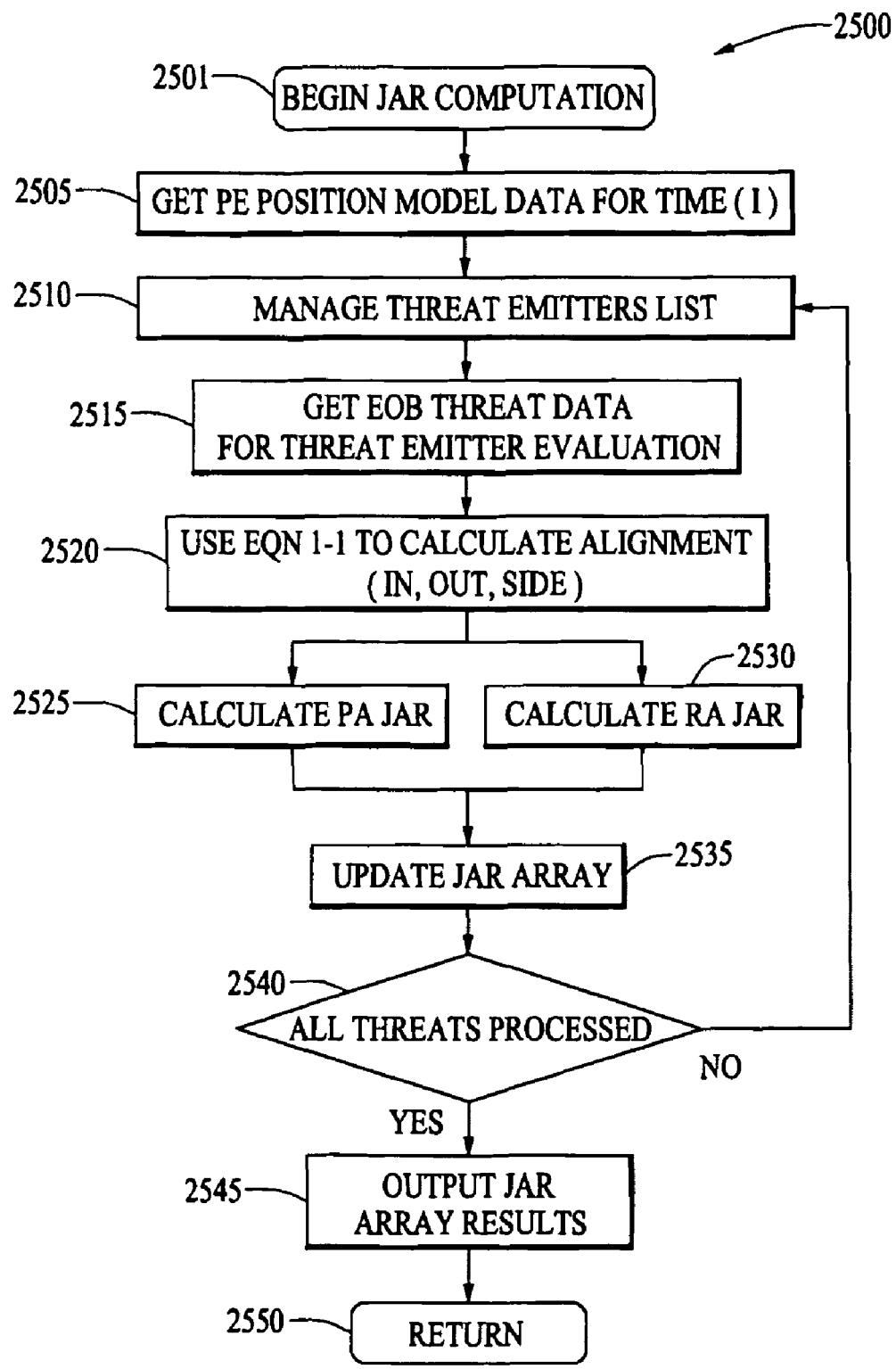
FIG. 25 is a high level flowchart depicting the operation of the JAR computation algorithm invoked as part of the DMR algorithm.

Referring to FIG. 25 item 2500, the JAR computation begins (step 2501) by first retrieving the modified positional data provided by the PE Position Model using the current time index (step 2505) as a reference and then building and managing a current list of threat emitters (step 2510). Management of the threat emitter list (step 2510) includes generating and manipulating an index that points to the current threat to be evaluated, storing the EOB information retrieved from computer memory (step 2515) and setting a flag to indicate that all threat emitters have been evaluated.

The input data set to seed JATO equation 1-1 are now available and JAR processing is invoked to first evaluate the alignment criteria (step 2520) which includes In Alignment, Out of Alignment or Side Lobe Alignment as described earlier in this specification. A PA JAR is then calculated in order to determine the PA range and the PA jamming effectiveness (step 2525). Simultaneously, an RA JAR is calculated in order to determine the RA range and the RA jamming effectiveness (step 2530). The results of the PA JAR and the RA JAR jamming effectiveness are then written to a JAR Array (step 2535). The JAR Array (step 2535) also contains an effectiveness flag associated with the results of each assessment. In one embodiment, the effectiveness flag is set to one to indicate that the evaluated input data set is effective for protecting the PE or the effectiveness flag is set to a zero to indicate that the input data set is not effective for protecting the PE.

A check is then made to determine if all threat emitters have been evaluated (step 2540) or whether another threat emitter requires evaluation. If the flag indicating that all threat emitters have been evaluated is set then the JAR Array is output (step 2545) and control is returned (step 2550) to the main thread (FIG. 24 item 2410). In the event that the flag indicating that all threat emitters have been evaluated is not set the next threat emitter in the list is evaluated according to the threat emitter index (step 2510). The next threat emitter to be evaluated uses the same PE and modified EA positional data set as the first iteration. The EOB data associated with the current threat emitter index is retrieved from computer memory (step 2515) and another cycle of alignment calculations (step 2520) and JAR calculations (steps 2525 and 2530) are performed with the results stored in the JAR Array.

Upon the conclusion of the JAR computations in the JAR Array contain a list of threat emitters for a given alternative position with each threat emitter having an assessment regarding its suitability for providing jamming protection for the PE. Those threat emitters in the JAR Array having flags set to zero, indicating inadequate jamming coverage for the PE, result in a rejection of the alternative position and no further JEP processing will be performed. When all of the threat emitters in the JAR Array have flags set to one, indicating adequate, viable, jamming coverage for the PE, further JEP processing is warranted.

Referring to FIG. 24, JEP processing resumes by evaluating the viable alternative positions for aircraft structural masking (step 2410). No structural masking check is required for rejected alternative positions. Aircraft structural masking occurs when the aircraft fuselage prevents the jamming RF from reaching the threat emitter, this is undesirable. This check is necessary due to the possibility that an alternative position may result in placing the aircraft structure between the RF jamming source and the threat emitter. If the viable alternative position does not result in structural masking then the viable alternative position is assigned a Jam Effectivity Score (step 2415). For those viable alternative positions that have been rejected due to structural masking (step 2410) a lower Jam Effectivity Score is assigned (step 2415).

In the preferred embodiment, a value of the assigned Jam Effectivity Score (step 2415) will reflect the adequacy of the PE jamming coverage and the extent of the projected EA aircraft maneuvers. The Jam Effectivity Score is a weighted value that indicates the number of modifications made to the initial alternative position. An example of quantifying the number of modifications to the initial alternative position is to evaluate the incremental changes cumulatively made to the heading, speed and altitude initial position as a result of the systematic variation of parameters. The higher the number of incremental changes made to the alternative positions during the systematic variations of the parameters the lower the Jam Effectivity Score. A fewer number of incremental changes made to the alternative position results in a higher Jam Effectivity Score. The lowest score is reserved for those alternative positions that do not provide adequate PE coverage.

Figure 26:
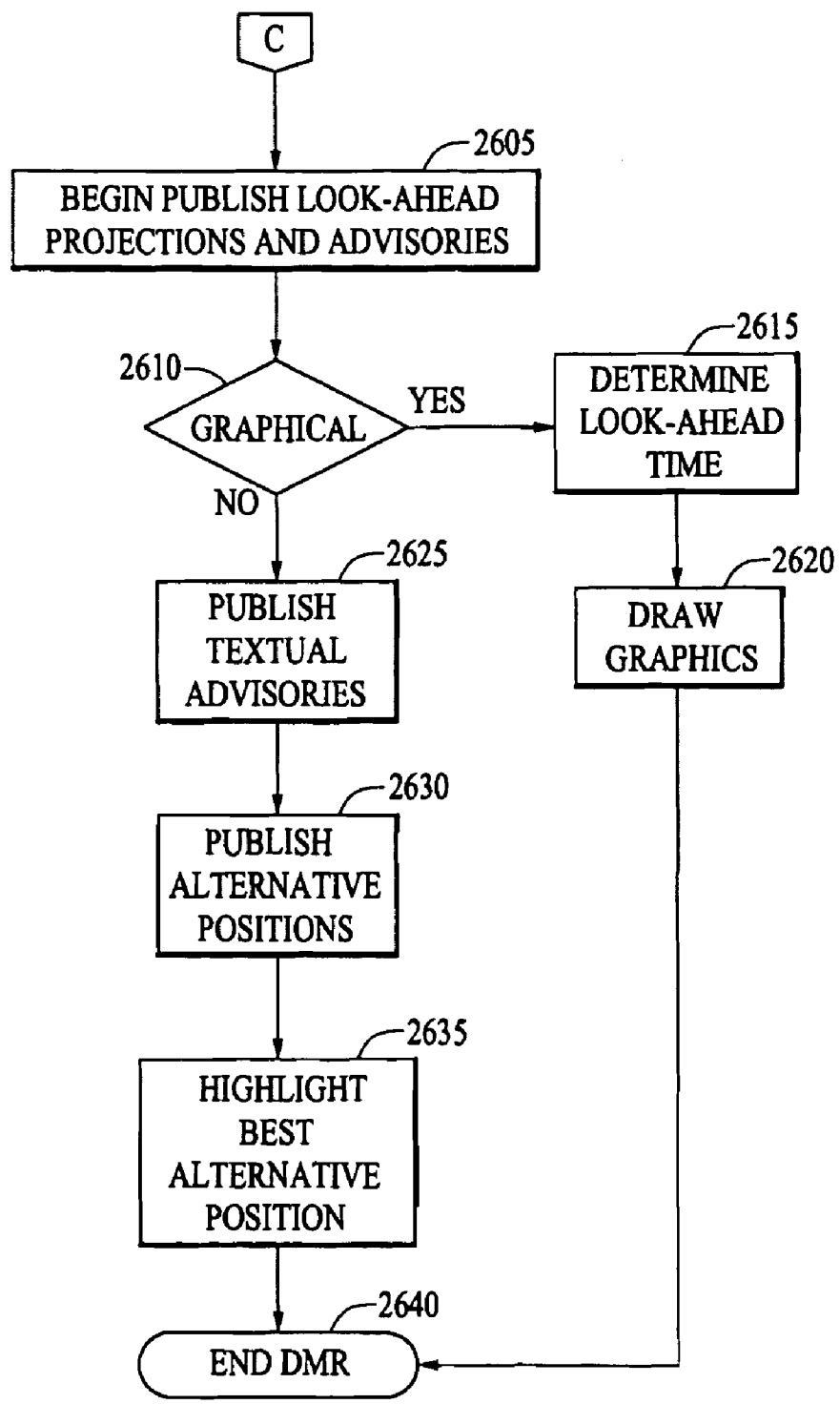
FIG. 26 is a lower level flow chart describing the software operations for the portion of the DMR algorithm that publishes a display to the aircrew showing the top scoring look-ahead positions and corresponding score.

An example of systematically varying the initial data provided by the position models with the incremental changes driven by the parameter flags follows. If a 4-5 degree heading change improves the alternative position and improves the score, then the logic must try a +10 degree heading change to see if the alternative position and corresponding score continues to improve. The DMR processing (steps 2305 through 2450 of FIGS. 23 and 24 respectively) will thereby continue to adjust a given combination of parameters until it either no longer improves the score or until a pre-set limit is reached, as when a speed change drops below an RF power interlock limit to prevent radiating sufficient jam power or until a time interval has elapsed. The results of the alternative evaluations for combinations of heading, speed and altitude changes will be stored in a score array (FIG. 24 step 2425) for publishing (FIG. 26 steps 2195 through 2600).

A check is then made (step 2420) to determine if the Jam Effectivity Score (step 2415) is an improved score relative to the corresponding score stored in a Score Array. If the Jam Effectivity Score has improved in comparison to the score stored in the Score Array then the Score Array is updated with both the data for the modified alternative position and the Jam Effectivity Score (step 2425). A check is then made (step 2430) to determine if the heading, speed and altitude parameters have not exceeded the aerodynamic limits set during preflight. If the preset limits for any of the parameters have not been exceeded and the parameter flag indicates that the field is to be systematically varied then an incremental change is made to the appropriate parameter (step 2435) and the JEP process is again invoked (step 2405). This process repeats until all of the parameters have reached the preflight limits.

If the preset limit for any parameter will be exceeded in a subsequent modification (an incremental change) then the check at step 2430 results in an increment of the minor loop counter (step 2440). At this point, one of twenty-seven iterations is complete and the Score Array holds a data set representing the scored alternative position for a given set of parameter flags.

An end of minor loop check (step 2445) is then made to determine if the minor loop counter has incremented (step 2440) beyond the bounds of the Alternative Array, the boundary of the Alternative Array was set in FIG. 23 step 2320. If the minor loop check (step 2445) determines that the minor loop increment (step 2440) is valid then program control is routed to step 2325 for a subsequent iteration of the minor loop. The subsequent iteration of the minor loop obtains the next set of parameter flags in the Alternatives Array for modifying the next set of extrapolated position model data. This cycle continues until the boundaries of the Alternative Array are exceeded.

When the boundaries of the Alternatives Array are exceeded the contents of the Score Array are evaluated for data sets containing positional data with a Jam Effectivity Score that indicates adequate PE jamming coverage can be provided by the EA. Those data sets in the Score Array having Jam Effectivity Scores that indicate adequate PE jamming coverage can be provided by the EA are sorted hierarchically using the Jam Effectivity score and then number of data sets that provide adequate PE coverage are tallied. The tally results in assignment of a new minor loop iteration limit (step 2450). Only those data sets in the Score Array that yield adequate PE jamming coverage are eligible for the next round of evaluation. This winnowing of data sets in the Scoring Array are necessary to decrease the computational cycle time that accompanies executing the DMR algorithm and also provides the added benefit of providing quicker results to the aircrew.

After resetting the minor loop counter (step 2450) a check is made to determine if the major loop counter has been exceeded (step 2455). If the time interval that defines the major loop counter has not been exceeded program flow continues (FIG. 23 step 2315). Specifically, the major loop is incremented (FIG. 23 step 2315) in order to process the next pair of Parameter Flag settings and the Positional Variables Array where the next Positional Variables Array data in this example is the positional model data for the next extrapolation period, two minutes. Another round of arrays management is performed and the minor loop counter is assigned using the value in step 2450. In the event that the check (step 2455) determines the maximum for the major loop counter, five minutes, has been exceeded (step 2455) program flow continues as shown on FIG. 26 step 2605. The DMR algorithm now turns to publishing the results of JEP processing using the contents of a final Scoring Array (FIG. 27 item 2700) as calculated in FIG. 24 step 2425. A Scoring Array is final when the data associated with the maximum extrapolation time is processed.

Referring to FIG. 27 item 2700, the final Scoring Array for the preferred embodiment has a plurality of rows and columns wherein item 2705 is a cell having a reference coordinate of row one, column one and item 2710 is a different cell having a reference coordinate of row seven, column twelve. Item 2715 has a reference coordinate of row zero, column zero. The information in all of row zero and in all of column zero is not part of the final Scoring Array and is only provided to aid the reader. The cells in row zero contain a header identifying the type of data written in the column. Item 2720 includes the columns containing the first minute of extrapolated data corresponding to a major loop iteration (FIG. 23 step 2315). Item 2720 also includes the rows of extrapolated data for the first minute, through the twenty-seventh iteration (Pass) of the minor loop (FIG. 23 step 2325) and also includes the row (item 2730) holding the tally corresponding to the of the number of data sets eligible for the next JEP processing cycle by virtue of providing adequate PE coverage. Item 2725 contains data extrapolated for minute two with the data extrapolated for minute two. Data through extrapolated minute five (item 2735) is included in the final Scoring Array (item 2700) and arranged in a hierarchical manner using the Jam Effectivity Score as the ranking factor.

Referring to FIG. 26, step 2605 begins that portion of the DMR algorithm that publishes the look-ahead projections and advisories. A check is made to determine if the user selection is for a graphical format or a textual format (step 2610). In one embodiment the results to command drawing graphical displays as shown in FIG. 18 (item 1800) are under user control as depicted in the Display Management Routine (FIG. 16 item 1740). If the check (step 2610) is positive then the look-ahead time interval (step 2615) as set by the cluster of labels associated with push-tiles for controlling the time for the look-ahead projection (FIG. 18 item 1805) is used to extract data from the final Scoring Array (FIG. 27 item 2700). The tactical graphics are then drawn (step 2620) according to the Display Mode Control State diagram (FIG. 16 item 1700). Program control is then routed to the end of the DMR algorithm (step 2640).

Figure 19A:
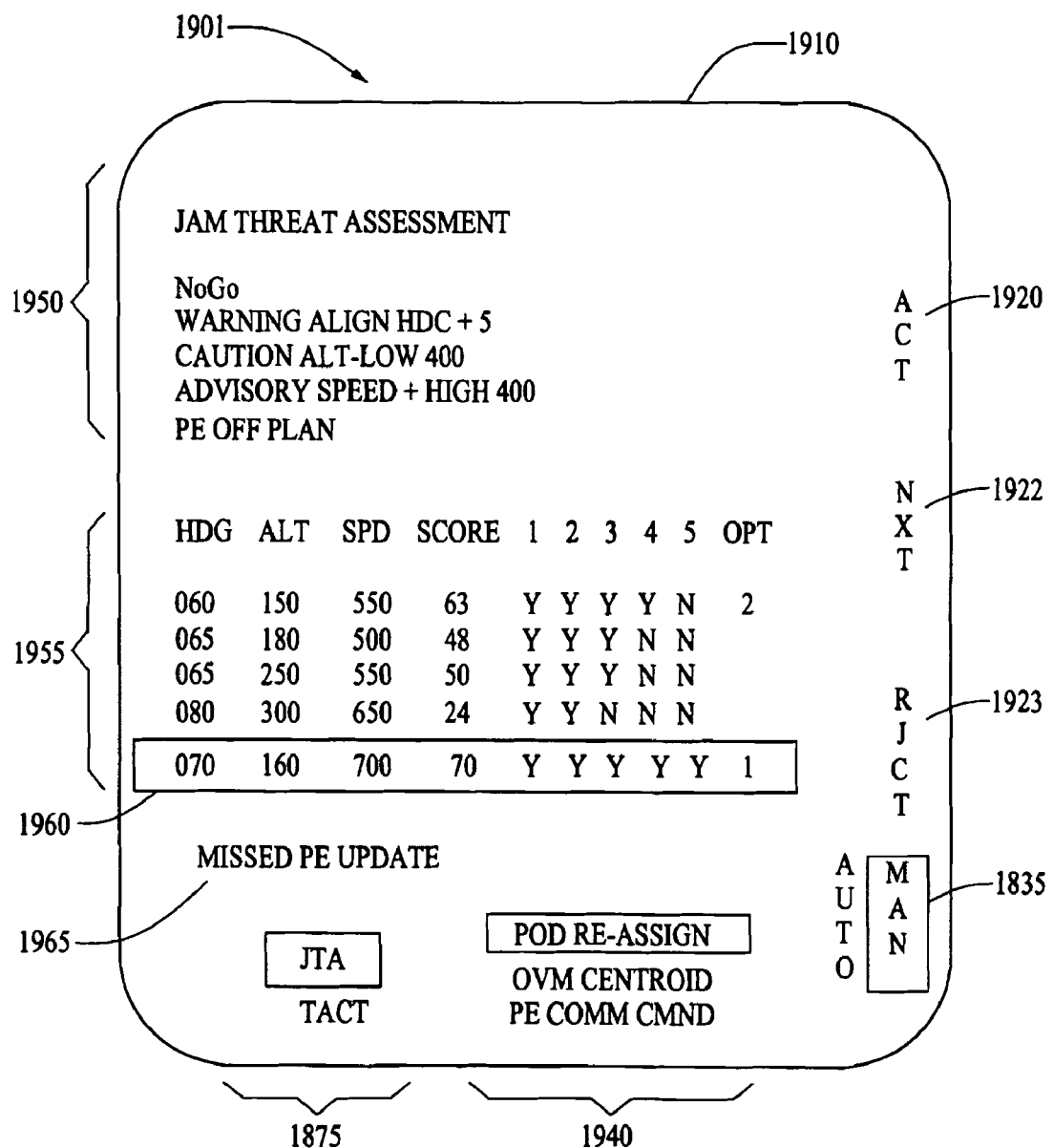
FIG. 19A is a drawing of a representative display format depicting advisories, warnings, a jamming equipment control interface and a table of "look-ahead" projections.

In the event that the check in step 2610 is negative, because the user is commanding a textual display format, the textual display of information extracted from the final Scoring Array (FIG. 27 item 2700) is published for presentation to the aircrew (step 2625). In one embodiment, the textual display of information (FIG. 19A item 1955) extracted from the final Scoring Array (FIG. 27 item 2700) is published in a table format with columns for heading (HDG), altitude (ALT), speed (SPD), JEP score (SCORE), the eligibility flag status (Y or N) for the five extrapolated time intervals and ranking (OPT) for the JEP score (step 2630). A DMR advisory (FIG. 19A item 1965) is published indicating that the missed update flag (FIG. 22 step 2235) exceeds the programmed value. In order to facilitate rapid assimilation of the alternative position data (FIG. 19A item 1955) the best alternative position (FIG. 19A item 1960) is highlighted by boxing (step 2635). Program control is then routed to the end of the DMR routine (step 2640).

It is not necessary to limit the implementation of the invention to the preferred embodiments described in this specification, to limit integration of the disclosed algorithms and displays to currently existing platform computers or to limit the currently existing platform interfaces or to current electronic warfare capabilities. The nature of this invention is a JAR processing algorithm which invokes a plurality of embedded software routines to build displays that are readily adaptable to a number of platforms, user requirements and user environments.

The algorithms described herein may be programmed in any suitable programming language for operation on compatible computer processors and computer processing hardware. The computer language for the preferred embodiment is an object oriented language with error recovery features to allow algorithm execution in the presence of data or computer errors. The preferred embodiment is loaded onto a computer readable medium which may include, but are not limited to, memory disks, flash memory devices, optically read media, and mass storage devices.

The terms "aircraft" and "platform," as well as "aircrew," "flight crew," and "user" have been used throughout this specification interchangeably. One skilled in the art of electronic warfare may adapt the applicant's invention to any platform that operates in any area for which there is a need to provide rapid assessment of defensive and offensive electronic warfare capability and such adaptation is within the scope of the present invention. It is necessary for the platform that is used for operating the algorithms described herein to have a power supply for supplying power to the computers, computer processors, memory storage devices, display heads, electrical interfaces and other associated hardware.

Figure 28:
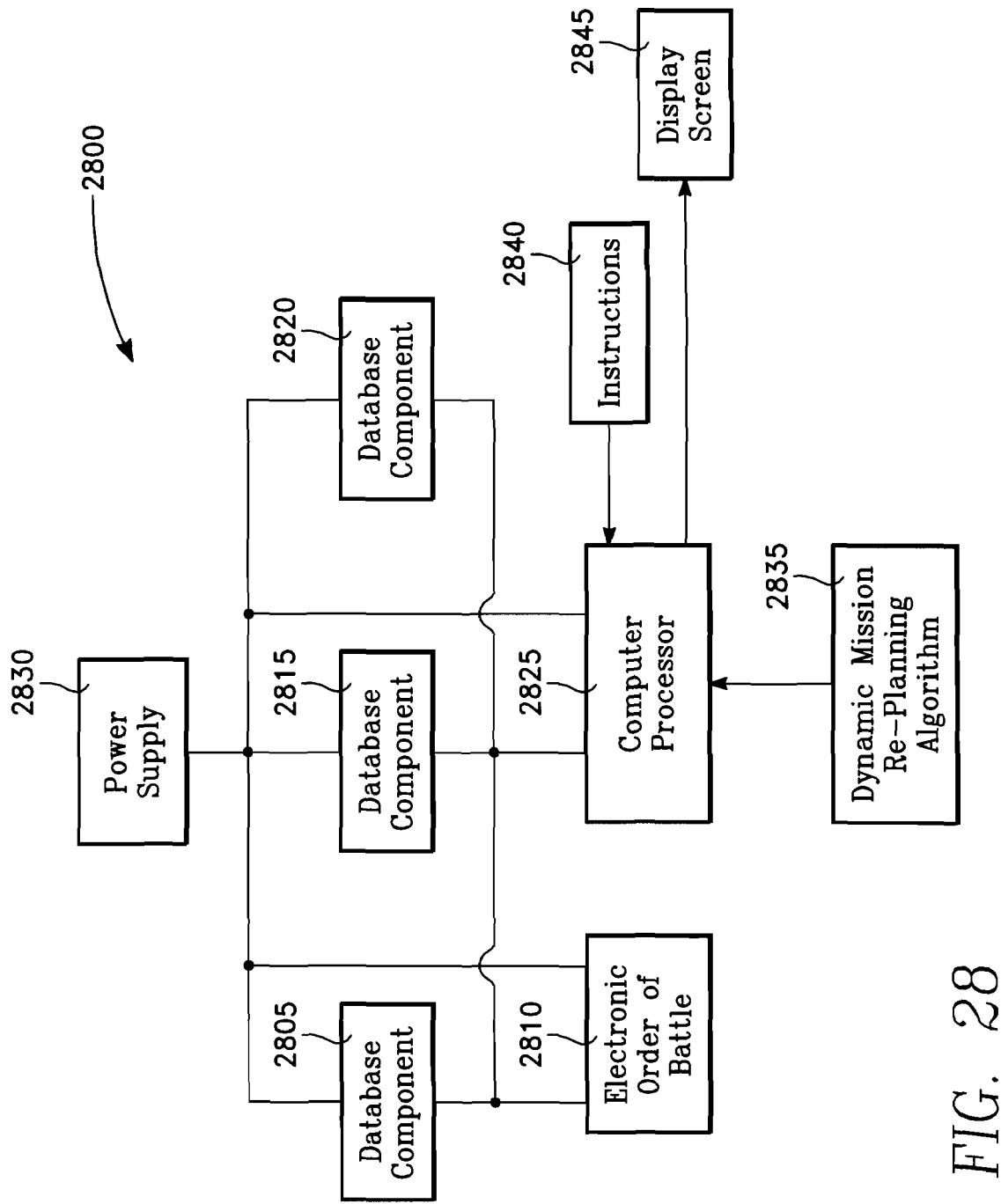
FIG. 28 is a block diagram describing a first system for generating a look-ahead flight path for an EA aircraft.

Referring to FIG. 28, there is shown a block diagram for a system 2800 for generating a look-ahead flight path which includes a database component 2805 operatively coupled with an electronic order of battle 2810. Database component 2805 is operative to maintain data extracted from the electronic order of battle 2810. System 2800 has a database component 2815 operative to maintain platform position model data and a database component 2820 operative to maintain final scoring array data.

System 2800 also has a computer processor 2825 operatively coupled with database component 2805, database component 2815, database component 2820, and a power supply 2830.

Computer processor 2825 is programmed with a dynamic mission re-planning algorithm 2835 and instructions 2840 to execute the dynamic mission re-planning algorithm 2835.

The dynamic mission re-planning algorithm 2835 within computer processor 2825 is operable to calculate look-ahead flight path data.

The system 2800 also includes a display screen 2845 which presents to a user a hierarchical listing of a plurality of elements of the final scored array data. The hierarchical listing uses a jamming effectiveness score.

Figure 29:
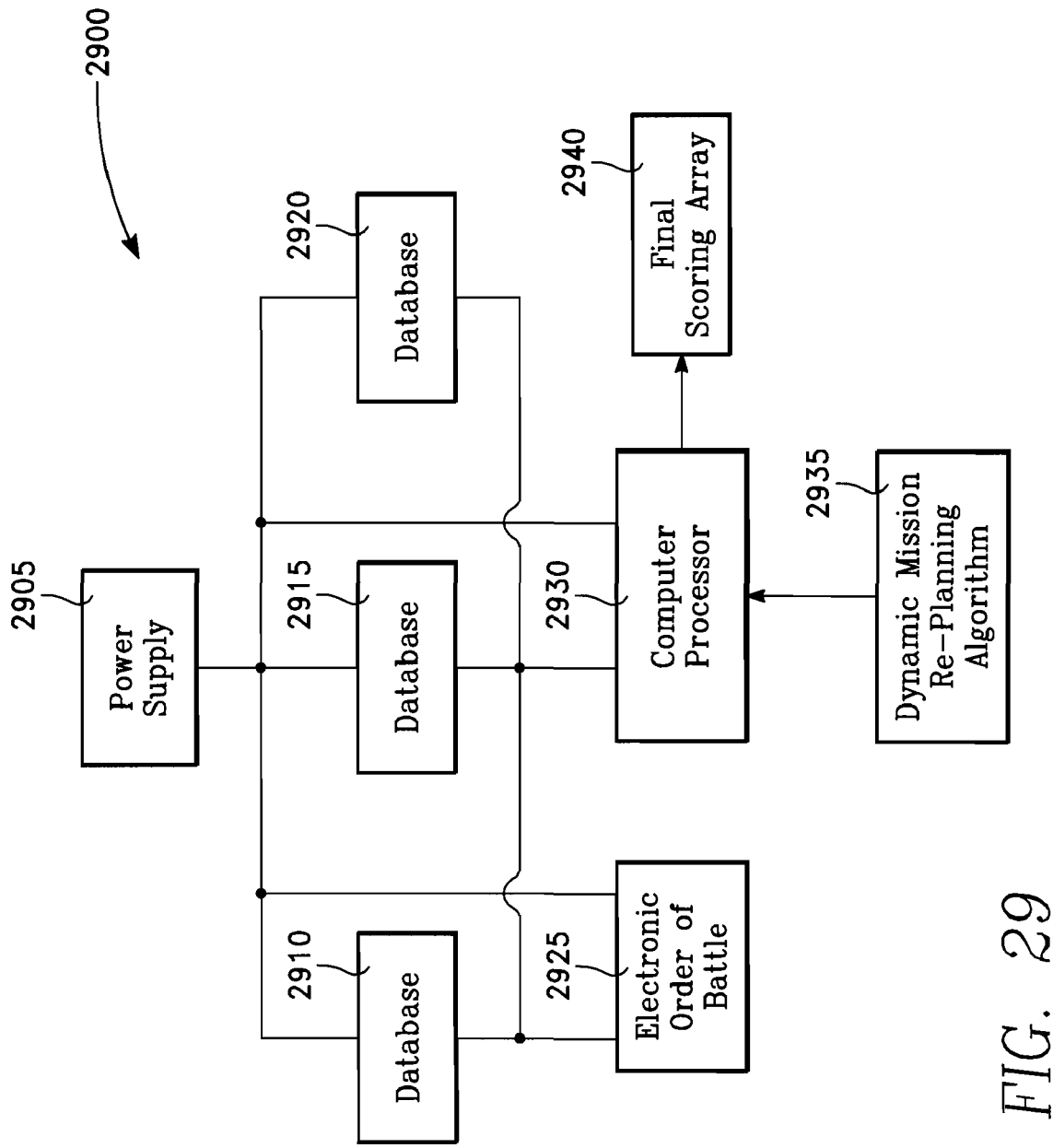
FIG. 29 is a block diagram describing a second system for generating a look-ahead flight path for an EA aircraft.

Referring now to FIG. 29, there is shown a block diagram for a system 2900 for generating a look-ahead flight path which includes a power supply 2905. Power supply 2905 is operatively coupled to a database 2910, a database 2915, a database 2920, an electronic order of battle 2925, and a computer processor 2930. Database 2910 is operatively coupled with and operative to maintain data accessed from electronic order of battle 2925. Database 2915 is operative to maintain platform position model data. Computer processor 2930 is programmed to execute the dynamic mission re-planning algorithm 2935 illustrating in the computer software flowcharts of FIGS. 21-26.

The dynamic mission re-planning algorithm 2935 within computer processor 2930 is operable upon the electronic order of battle 2925 data and the platform position model data of database 2915 to calculate look-ahead flight path data.

Database 2920 is operative to maintain the look-ahead flight path data calculated by computer processor 2930. The system 2900 outputs the look-ahead flight path data calculated by the dynamic mission re-planning algorithm 2935. The look-ahead flight path data is maintained in a final scoring array 2940.

Figure 30:
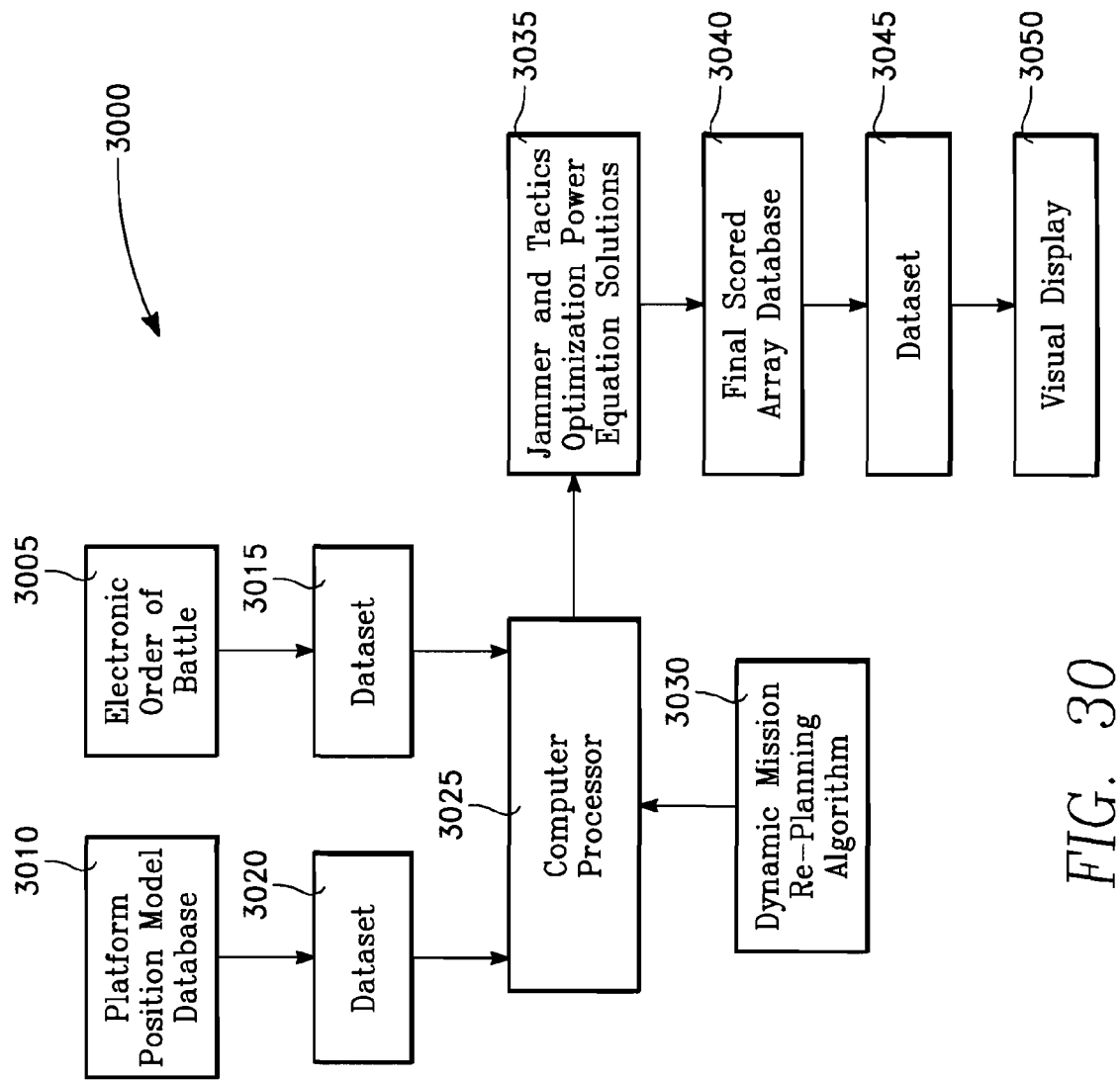
FIG. 30 is a block diagram describing a third system for generating a look-ahead flight path for an EA aircraft.

Referring to FIG. 30, there is shown a system 3000 for generating a look-ahead flight path which includes an electronic order of battle 3005 having retrievable datasets and a platform position model database 3010 also having retrievable datasets. System 3000 also has a dataset 3015 which is retrieved from the electronic order of battle 3005 and a dataset 3020 which is retrieved from the platform position model database 3010. A computer processor 3025 is programmed to process dataset 3015 and dataset 3020 and to execute a dynamic mission re-planning algorithm 3030. The dynamic mission re-planning algorithm 3030 is operable upon dataset 3015 and dataset 3020 to solve a jammer and tactics optimization power equation.

The computer processor 3025 is also programmed to output jammer and tactics optimization power equation solutions 3035 to a final scored array database 3040 which includes retrievable datasets. Further, the computer processor 3025 is programmed to output a dataset 3045 which is retrieved from the final scored array database 3040 to form a look-ahead flight path.

Dataset 3045 is then output to a graphical and textual visual display 3050 for viewing by a user.

Although the present invention has been described in considerable detail with references to certain preferred versions thereof, other versions are possible. For example, permutations of presented text and graphics are as numerous as there are fonts, colors, textures and user preferences. Another example, a software programmer may substitute the array data structures with databases having data stored in retrievable datasets, matrices having data stored in retrievable data cells, or other types of data structures that can store and access data. Therefore, the spirit and scope of the appended claims should not be limited to the description of the preferred versions contained herein.

What is claimed is:

1. A system for generating a look-ahead flight path comprising:
   a first database component operatively coupled with an electronic order of battle operative to maintain data extracted from said electronic order of battle;
   a second database component operative to maintain a plurality of platform position model data;

a third database component operative to maintain final scoring array data; and a computer processor operatively coupled with said first database component, said second database component, said third database component, and a power supply;

said computer processor programmed with a dynamic mission re-planning algorithm and instructions to execute said dynamic mission re-planning algorithm;

said dynamic mission re-planning algorithm operable to calculate look-ahead flight path data.

2. The system of claim 1 wherein said second database component includes a first heading, a first speed and a first altitude corresponding to a position of an electronic attack platform.

3. The system of claim 1 wherein said second database component includes a second heading, a second speed and a second altitude corresponding to a position of a protected entity platform.

4. The system of claim 1 wherein said instructions to execute a dynamic mission re-planning algorithm includes instructions to generate a nested looping structure comprising:

a main loop structure to control a time based extrapolation of said plurality of said position model data; and a minor loop structure operating within said main loop structure to generate a plurality of scored alternative positions wherein said scored alternative positions are optimized for jamming effectiveness.

5. The system of claim 1 wherein a display screen presents to said user a hierarchical listing of said plurality of elements of said final scored array wherein said hierarchical listing uses a jamming effectiveness score.

6. A computer program product in a computer readable medium having computer program code recorded thereon, wherein a program code includes sets of instructions comprising:

first computer instructions for accepting a plurality of parameter data including a plurality of navigational data, a plurality of external messages containing positional data and a system time tag;

second computer instructions for maintaining in computer memory a plurality of position models wherein a maintenance of said plurality of position models incorporates said plurality of parameter data;

third computer instructions for managing in computer memory a plurality of arrays including a parameter flag array, an alternatives position array, a scoring array and a final scoring array;

fourth computer instructions for performing a time based extrapolation upon said plurality of position models wherein said time based extrapolation extrapolates each of said plurality of parameter data;

fifth computer instructions for storing within said alternatives position array a result of said time based extrapolation as a set of extrapolated parameter data;

sixth computer instructions for modifying said set of extrapolated parameter data as determined by a plurality of flag settings contained within said parameter flag array resulting in a modified set of extrapolated parameter data wherein a location of each of said plurality of flag settings are mapped to a corresponding location within said alternatives position array to define modifying said modified set of extrapolated parameter data;

seventh computer instructions for determining a jam effectivity score wherein said jam effectivity score is determined for each of said modified set of extrapolated parameter data contained within said alternatives position array;

eighth computer instructions for creating a first iterative loop structure to optimize said jam effectivity score by incrementally changing said modified set of extrapolated parameter data within said alternatives position array wherein an execution of said first iterative loop structure results in an optimized set of extrapolated parameter data and a corresponding optimized jam effectivity score;

ninth computer instructions for populating said scoring array with a first hierarchical list of entries wherein said first hierarchical list of entries includes said optimized set of extrapolated parameter data and said corresponding optimized jam effectivity score;

tenth computer instructions for creating a second iterative loop structure to generate a plurality of said scoring arrays for a plurality of one minute extrapolation intervals;

eleventh computer instructions for creating a final scoring array by sorting said plurality of said scoring arrays wherein a result of said sorting is a second hierarchical list using said optimized jam effectivity score; and twelfth computer instructions for displaying said final scoring array wherein said final scoring array provides a look-ahead projection of jamming effectiveness.

7. The computer program product of claim 6 wherein said plurality of navigational data includes electronic attack (EA) aircraft heading, speed and altitude.

8. The computer program product of claim 6 wherein said plurality of external messages containing positional data includes protected entity (PE) aircraft heading, speed and altitude.

9. The computer program product of claim 6 wherein said plurality of one minute extrapolation intervals is a maximum of five one minute extrapolation intervals.

10. The computer program product of claim 6 wherein said seventh computer instructions for determining said jam effectivity score further includes instructions to implement sets of computer routines comprising:

first computer routine for accepting information stored within an electronic order of battle;

second computer routine for accepting said plurality of parameter data;

third computer routine for executing a jammer and tactics optimization power equation wherein said jammer and tactics optimization power equation accepts as input said information stored within said electronic order of battle and said plurality of parameter data; and fourth computer routine for communicating a result of said third computer routine to said eighth computer instruction.

11. A system for generating a look-ahead flight path comprising:

a power supply operatively coupled with a first database, a second database, a third database, an electronic order of battle, and a computer processor;

said computer processor operatively coupled with said first database, said second database, said third database, and said electronic order of battle;

said first database operatively coupled with and operative to maintain data accessed from said electronic order of battle;

said second database operative to maintain a plurality of platform position model data;

said computer processor programmed to execute a dynamic mission re-planning algorithm;

said dynamic mission re-planning algorithm operable upon said electronic order of battle data and said platform position model data to calculate look-ahead flight path data;

said third database operative to maintain look-ahead flight path data.

12. The system of claim 11 wherein said dynamic mission re-planning algorithm includes a jammer and tactics optimization power equation.

13. The system of claim 11 wherein said output look-ahead flight path data calculated by said dynamic mission re-planning algorithm is maintained in a final scoring array.

14. A system for generating a look-ahead flight path comprising:

an electronic order of battle including retrievable datasets residing in a physical storage component;

a platform position model database including retrievable datasets residing in a physical storage component;

a first dataset retrieved from said electronic order of battle;

a second dataset retrieved from said platform position model database;

a computer processor programmed to process said first dataset and said second dataset and to execute a dynamic mission re-planning algorithm;

said dynamic mission re-planning algorithm operable upon said first dataset and said second dataset to solve a jammer and tactics optimization power equation;

said computer processor programmed to output said jammer and tactics optimization power equation solutions to a final scored array database including retrievable datasets; and said computer processor programmed to output a third dataset retrieved from said final scored array database to form a look-ahead flight path.

15. The system for generating a look-ahead flight path of claim 14 wherein said third dataset is output to a graphical and textual visual display.

* * * * *